(12) United States Patent
Fritz-Jung et al.

(10) Patent No.: US 9,974,314 B2
(45) Date of Patent: May 22, 2018

(54) AUTOMATED PIZZA ASSEMBLY SYSTEM

(75) Inventors: Cathryn Fritz-Jung, Sheboygan, WI (US); David Scrivano, South Lyon, MI (US); David Strother, Farmington Hills, MI (US); Amanda B. Thomas, Livonia, MI (US); Sean M. Heslip, Manchester, MI (US); Kent A. Deemter, Hudsonville, MI (US); Tyler W. McCoy, Holland, MI (US); Bret A. Hoeksema, Zeeland, MI (US)

(73) Assignee: Little Caesar Enterprises, Inc., Detroit, MI (US)

( * ) Notice: Subject to any disclaimer, the term of this patent is extended or adjusted under 35 U.S.C. 154(b) by 1135 days.

(21) Appl. No.: 13/222,319

(22) Filed: Aug. 31, 2011

(65) Prior Publication Data

US 2012/0024170 A1  Feb. 2, 2012

Related U.S. Application Data

(63) Continuation-in-part of application No. 13/033,650, filed on Feb. 24, 2011.
(Continued)

(51) Int. Cl.
*A47J 37/04* (2006.01)
*A21C 9/04* (2006.01)
*B25J 11/00* (2006.01)

(52) U.S. Cl.
CPC ............... *A21C 9/04* (2013.01); *B25J 11/00* (2013.01); *B25J 11/0045* (2013.01)

(58) Field of Classification Search
CPC .......................................... A47J 37/00–37/046

USPC ......... 99/423, 443 R, 441, 360–362; 83/707, 83/713, 719, 435.11–435.25, 409; 426/518; 219/388, 656, 776
See application file for complete search history.

(56) References Cited

U.S. PATENT DOCUMENTS

| 2,190,483 A | 2/1940 | Pacilio |
| 3,633,450 A | 1/1972 | Grote |
(Continued)

FOREIGN PATENT DOCUMENTS

| GB | 2223391 A | 4/1990 |
| WO | 20081103907 A1 | 8/2008 |
| WO | WO-20080103907 A1 | 8/2008 |

OTHER PUBLICATIONS

International Preliminary Report on Patentability dated Aug. 28, 2012, relating to International Application No. PCT/US2011/025989.

*Primary Examiner* — Michael LaFlame, Jr.
(74) *Attorney, Agent, or Firm* — Honigman Miller Schwartz and Cohn LLP

(57) ABSTRACT

An apparatus is provided for assembling a pizza, including a pizza sauce spreading station, a cheese spreading station and a pepperoni applying station. A robot including a stationary base and an articulating arm having a gripper attached to the end is operable to grip a pizza pan having pizza dough therein to allow said robot to move the pan throughout the pizza sauce spreading station, and to a rotary dial system including the cheese spreading station and the pepperoni applying station. The robot arm manipulates the pizza pan in the sauce spreading station and the rotary dial system manipulates the pizza pan in the cheese station and the pepperoni applying station to properly distribute the cheese and pepperoni on the pizza.

26 Claims, 37 Drawing Sheets

Related U.S. Application Data

(60) Provisional application No. 61/308,487, filed on Feb. 26, 2010, provisional application No. 61/320,337, filed on Apr. 2, 2010.

(56) References Cited

U.S. PATENT DOCUMENTS

| | | | | |
|---|---|---|---|---|
| 3,643,718 | A * | 2/1972 | Swann | 83/73 |
| 3,683,985 | A | 8/1972 | Verhoeven | |
| 3,735,692 | A | 5/1973 | Marchignoni | |
| 3,760,715 | A | 9/1973 | Grote et al. | |
| 3,851,554 | A | 12/1974 | Papai | |
| 3,860,990 | A | 1/1975 | Petruzzi | |
| 3,892,171 | A | 7/1975 | Fitch et al. | |
| 3,908,584 | A | 9/1975 | Raque | |
| 3,965,535 | A * | 6/1976 | Kaplan et al. | 452/138 |
| 4,088,249 | A | 5/1978 | Westling | |
| 4,112,545 | A | 9/1978 | Covington et al. | |
| 4,112,834 | A * | 9/1978 | Thiry | 99/450.1 |
| 4,145,990 | A | 3/1979 | Hochandel et al. | |
| 4,173,942 | A | 11/1979 | Plattner | |
| 4,388,689 | A | 6/1983 | Hayman et al. | |
| 4,723,614 | A | 2/1988 | Lahti | |
| 4,771,726 | A | 9/1988 | Fitch, Jr. | |
| 4,801,097 | A | 1/1989 | Fitch, Jr. | |
| 4,960,025 | A | 10/1990 | Fitch | |
| 5,012,726 | A * | 5/1991 | Fehr | A21C 9/063 99/450.6 |
| 5,085,138 | A | 2/1992 | Fehr et al. | |
| 5,109,760 | A | 5/1992 | Ansari | |
| 5,117,749 | A | 6/1992 | Bakker | |
| 5,121,677 | A | 6/1992 | Le Claire et al. | |
| 5,171,367 | A | 12/1992 | Fitch, Jr. | |
| 5,180,075 | A | 1/1993 | Montalbano | |
| 5,391,386 | A | 2/1995 | Mally | |
| 5,445,674 | A | 8/1995 | DeMars | |
| 5,458,055 | A * | 10/1995 | Fitch, Jr. | 99/450.1 |
| 5,509,601 | A | 4/1996 | Drabick | |
| 5,523,101 | A | 6/1996 | Fitch, Jr. | |
| 5,640,897 | A | 6/1997 | Fehr | |
| 5,678,476 | A | 10/1997 | Sanders | |
| 5,921,170 | A | 7/1999 | Khatchadourian et al. | |
| 5,997,924 | A | 12/1999 | Olander, Jr. et al. | |
| 6,026,372 | A | 2/2000 | Savage | |
| 6,051,070 | A | 4/2000 | Sunter | |
| 6,052,667 | A | 4/2000 | Walker et al. | |
| 6,086,934 | A | 7/2000 | Khatchadourian et al. | |
| 6,119,099 | A | 9/2000 | Walker et al. | |
| 6,267,670 | B1 | 7/2001 | Walker et al. | |
| 6,298,331 | B1 | 10/2001 | Walker et al. | |
| 6,325,016 | B1 | 12/2001 | Fitch, Jr. et al. | |
| 6,363,838 | B1 * | 4/2002 | Tomatis | A21C 11/00 99/349 |
| 6,422,421 | B1 | 7/2002 | Freudinger et al. | |
| 6,500,475 | B1 | 12/2002 | Kraklow et al. | |
| 6,526,874 | B1 | 3/2003 | Khatchadourian et al. | |
| 6,526,908 | B2 | 3/2003 | Gardner et al. | |
| 6,531,170 | B2 | 3/2003 | Hansen | |
| 6,546,847 | B2 | 4/2003 | Pilati et al. | |
| 6,558,721 | B1 | 5/2003 | Parsons et al. | |
| 6,575,725 | B1 | 6/2003 | Keel | |
| 6,598,519 | B1 | 7/2003 | Thomas et al. | |
| 6,626,996 | B1 | 9/2003 | Amigh et al. | |
| RE38,478 | E | 3/2004 | Fitch, Jr. et al. | |
| 6,755,122 | B2 | 6/2004 | Holmes | |
| 6,892,629 | B2 | 5/2005 | Tuyls et al. | |
| 6,915,734 | B2 | 7/2005 | Torghele et al. | |
| 7,074,277 | B2 | 7/2006 | Tuyls et al. | |
| 7,089,840 | B2 | 8/2006 | Freudinger et al. | |
| 7,127,984 | B2 | 10/2006 | Holmes | |
| 7,184,990 | B2 | 2/2007 | Walker et al. | |
| 7,232,062 | B1 | 6/2007 | Salerno | |
| 7,237,694 | B2 | 7/2007 | Freudinger | |
| 2001/0002674 | A1 | 6/2001 | Gubbini et al. | |
| 2001/0047301 | A1 | 11/2001 | Walker et al. | |
| 2002/0020348 | A1 | 2/2002 | Gardner | |
| 2002/0077912 | A1 | 6/2002 | Kargman | |
| 2002/0176921 | A1 * | 11/2002 | Torghele et al. | 426/549 |
| 2003/0055727 | A1 | 3/2003 | Walker et al. | |
| 2003/0120561 | A1 | 6/2003 | Asada | |
| 2003/0159596 | A1 | 8/2003 | Tuyls et al. | |
| 2003/0161947 | A1 | 8/2003 | Tuyls et al. | |
| 2003/0209194 | A1 * | 11/2003 | Amigh et al. | 118/24 |
| 2004/0020375 | A1 | 2/2004 | Holmes | |
| 2004/0133475 | A1 | 7/2004 | Kargman | |
| 2004/0194641 | A1 | 10/2004 | Holmes | |
| 2005/0004992 | A1 | 1/2005 | Horstmann et al. | |
| 2005/0021407 | A1 | 1/2005 | Kargman | |
| 2005/0123659 | A1 | 6/2005 | Torghele et al. | |
| 2005/0178277 | A1 | 8/2005 | Simonsen | |
| 2006/0218041 | A1 | 9/2006 | Mamedrzaev | |
| 2007/0050229 | A1 | 3/2007 | Tatro et al. | |
| 2007/0061209 | A1 | 3/2007 | Jackson | |
| 2007/0062353 | A1 | 3/2007 | Bodey et al. | |
| 2007/0181011 | A1 * | 8/2007 | Berglin et al. | 99/558 |
| 2007/0209526 | A1 * | 9/2007 | Visona | 99/450.1 |
| 2007/0214053 | A1 | 9/2007 | Salerno | |
| 2008/0072771 | A1 | 3/2008 | Marchi | |
| 2008/0162276 | A1 | 7/2008 | Nguyen et al. | |
| 2008/0162290 | A1 | 7/2008 | Leifer | |
| 2009/0129856 | A1 * | 5/2009 | Gomez et al. | 403/167 |
| 2010/0209570 | A1 * | 8/2010 | Powers et al. | 426/278 |

* cited by examiner

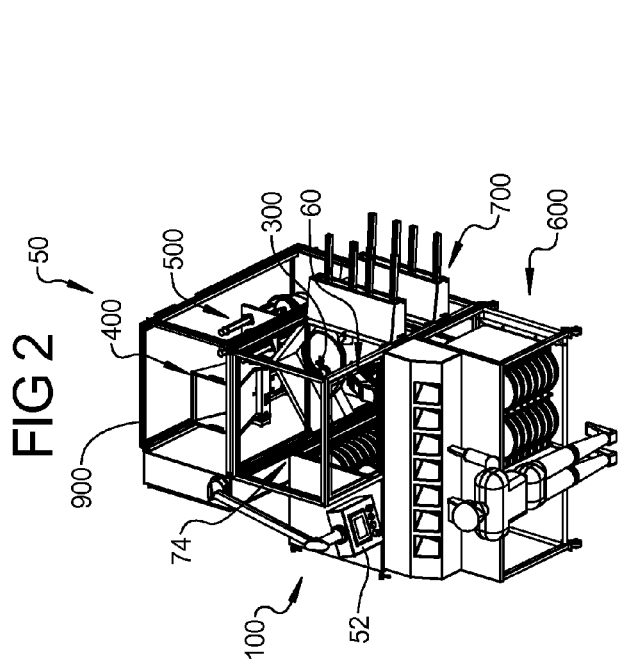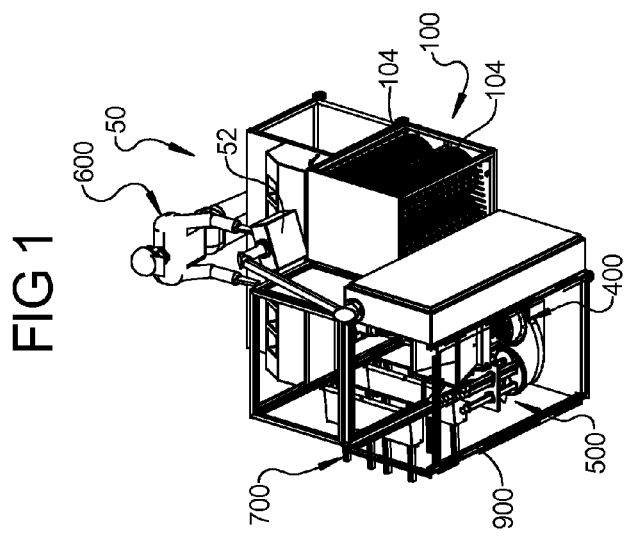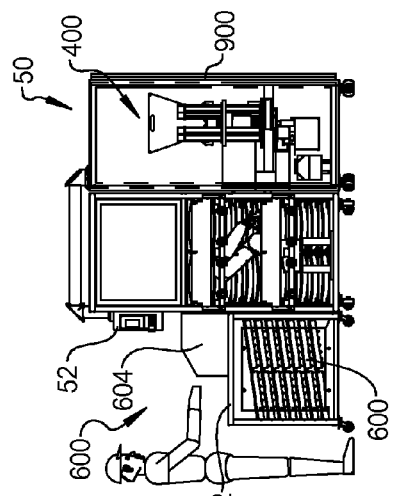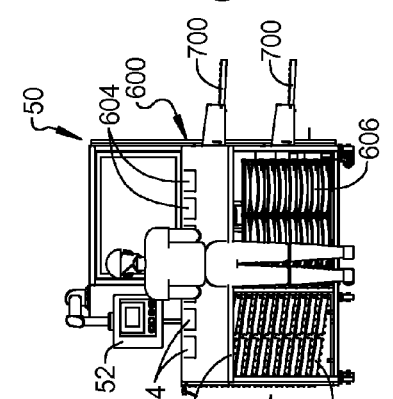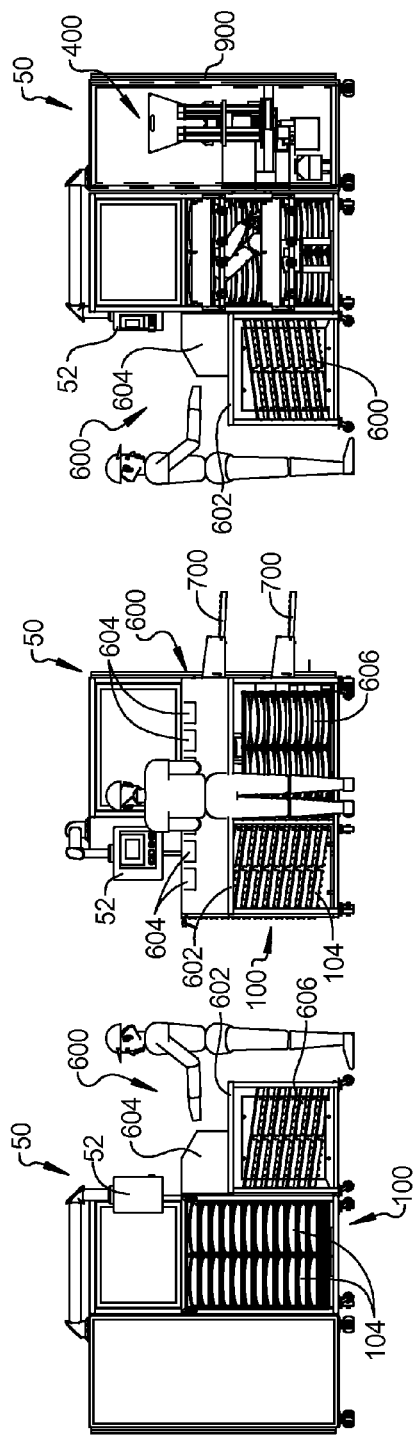

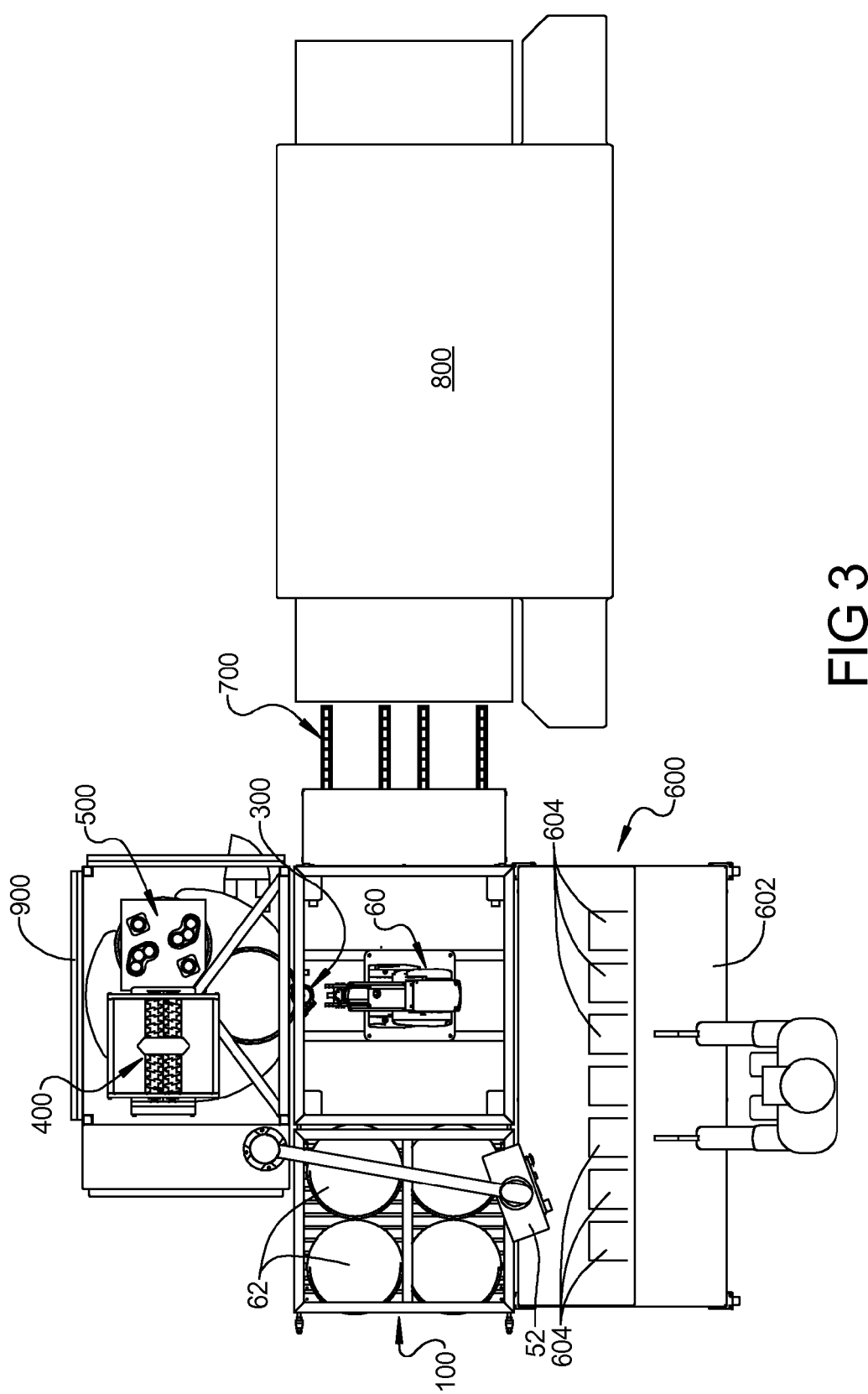

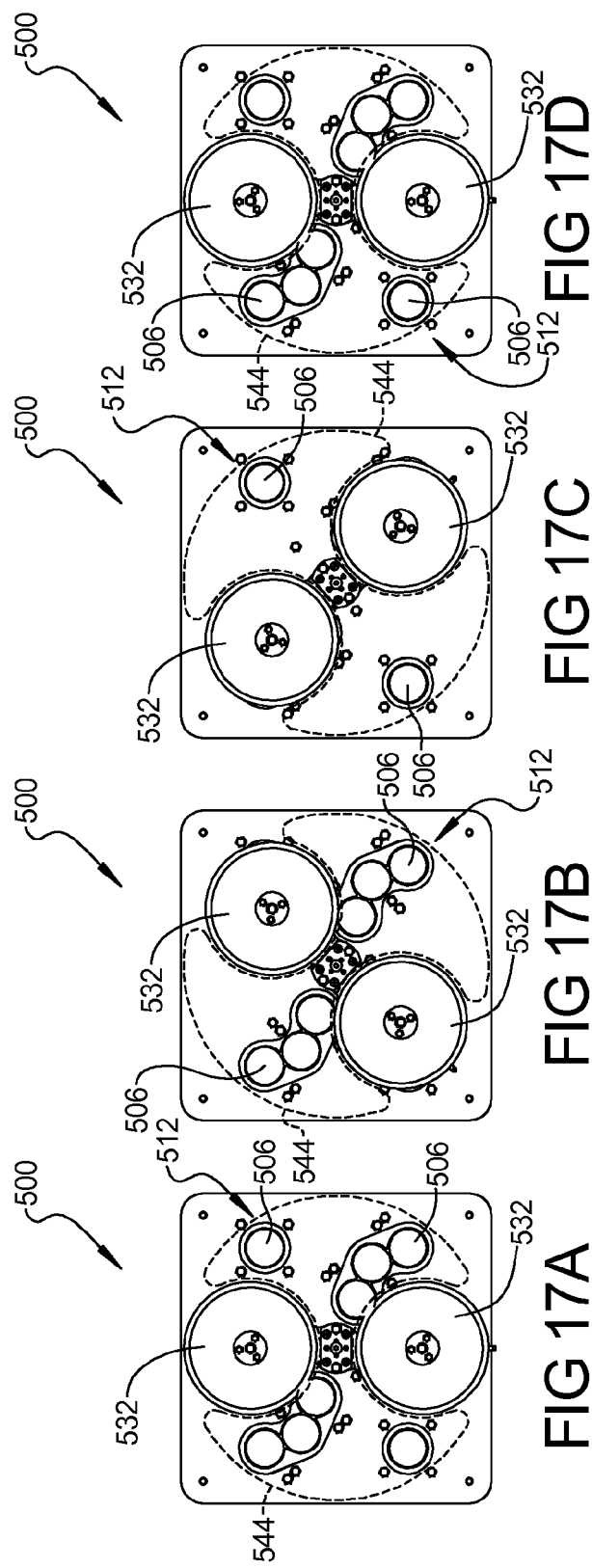

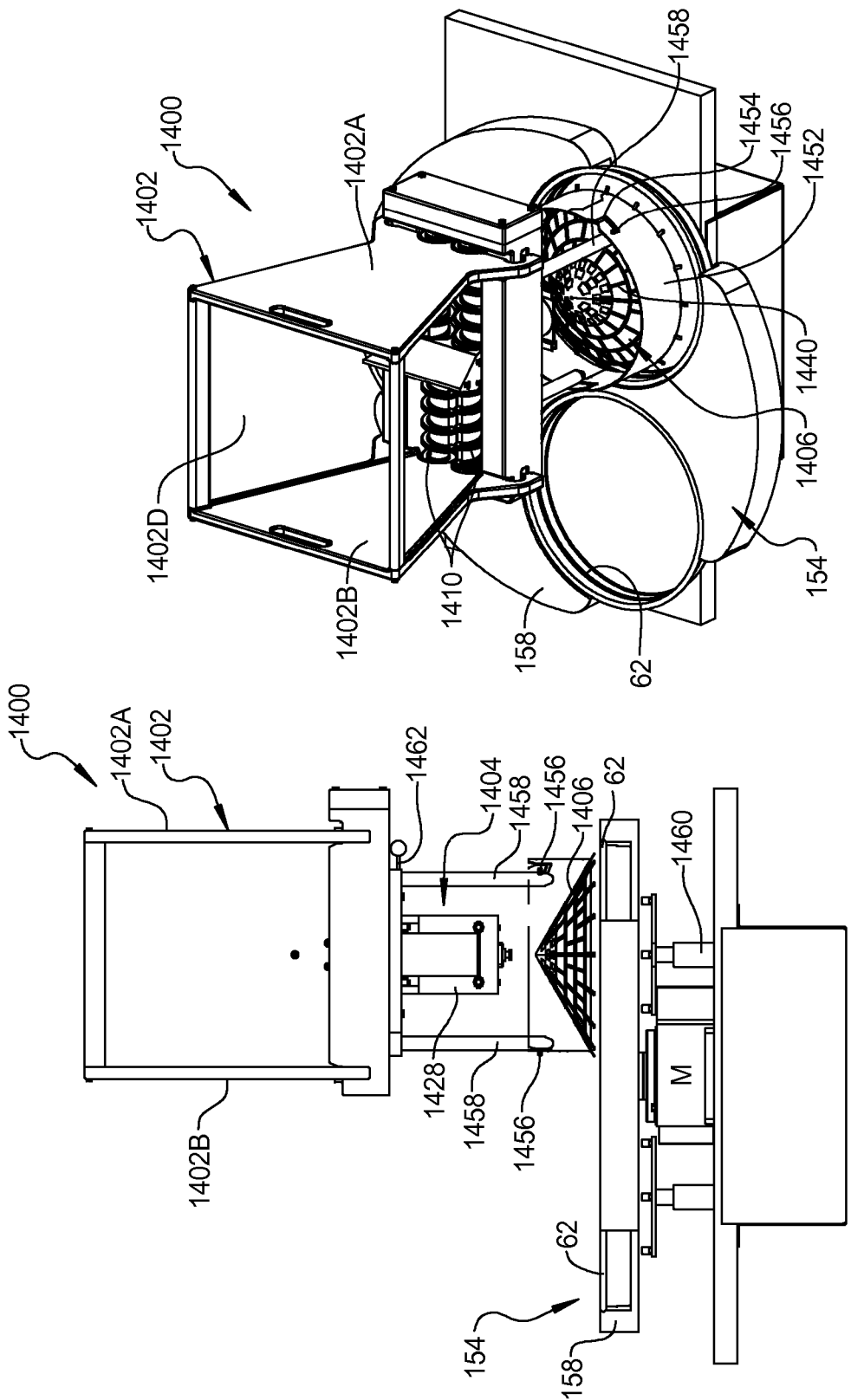

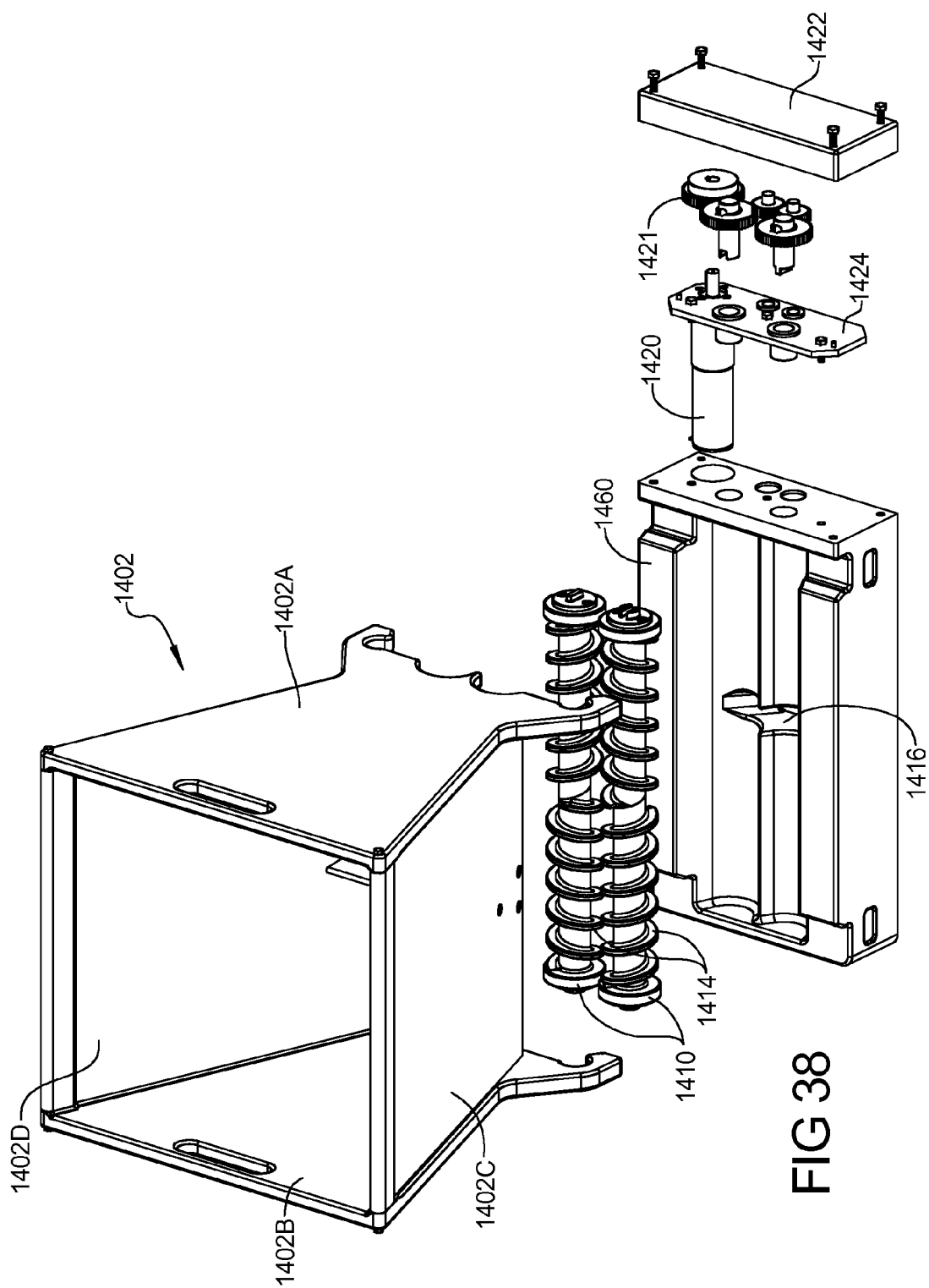

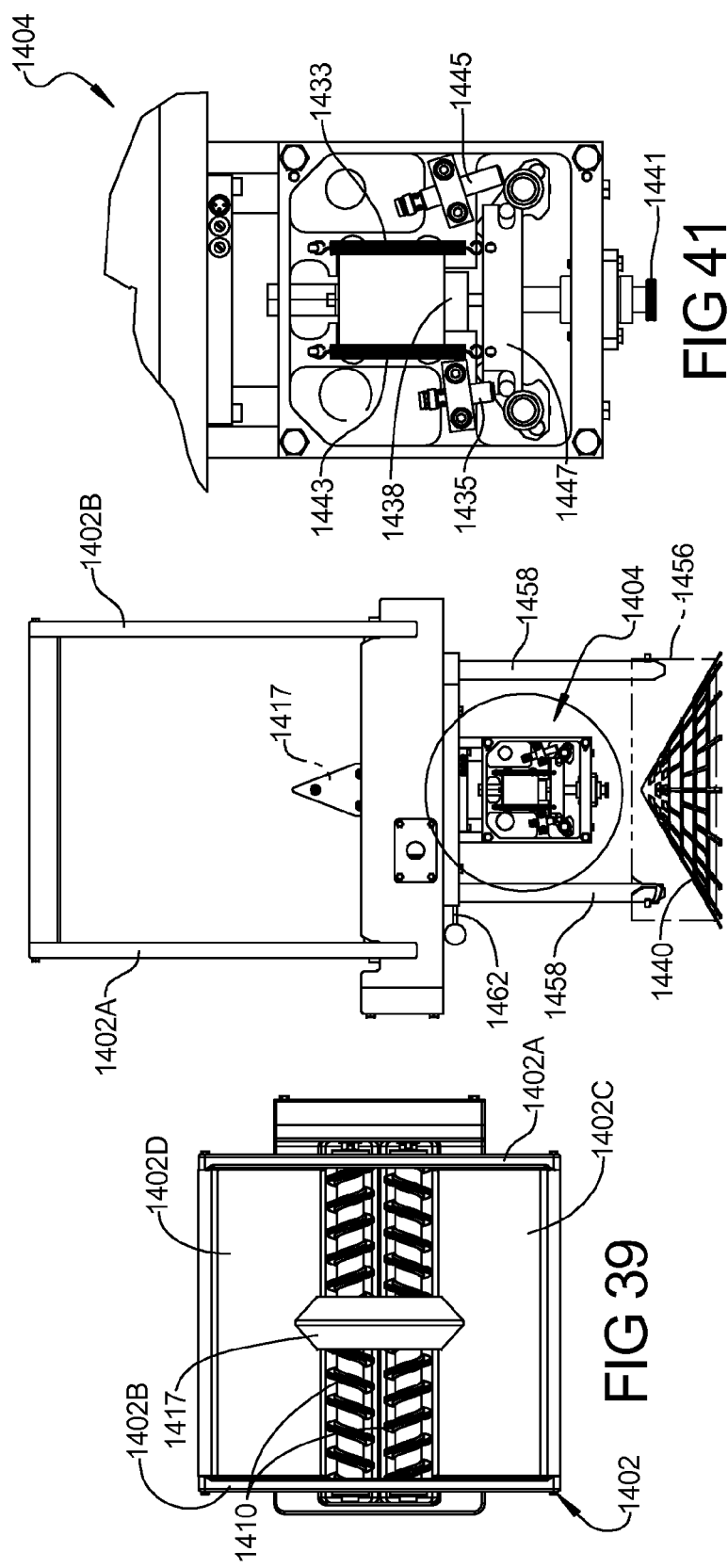

AUTOMATED PIZZA ASSEMBLY SYSTEM

CROSS-REFERENCE TO RELATED APPLICATIONS

This application is a continuation-in-part of U.S. patent application Ser. No. 13/033,650, which claims the benefit of U.S. Provisional Application No. 61/320,337, filed Apr. 2, 2010 and U.S. Provisional Application No. 61/308,487, filed Feb. 26, 2010. The entire disclosures of each of the above applications are incorporated herein by reference.

FIELD

The present disclosure relates to pizza assembly and, more particularly, to an automated pizza assembly system.

BACKGROUND AND SUMMARY

This section provides background information related to the present disclosure which is not necessarily prior art and also provides a general summary of the disclosure, and is not a comprehensive disclosure of its full scope or all of its features.

The assembly of pizzas in a retail establishment is a labor-intensive endeavor. Some of the steps performed by the worker may include the making of the dough; the preparation of a pizza pan; the spreading of the dough in the pizza pan; the applying of sauce, cheese, and other toppings; the moving of the pizza to the oven for baking; the removal of the pizza from the oven; the slicing of the pizza; and boxing the pizza for delivery to a customer. The automation of one or more of these steps may improve the efficiency of the pizza assembly process.

Additionally, the automation of one or more of the steps in the pizza assembly process may result in a more consistent quality for the assembled pizza. In particular, the quantity of sauce, the spreading of the toppings, the quantity and spacing of the toppings, etc. may be more consistently realized through the use of an automated process.

Accordingly, it would be advantageous to utilize an automated pizza assembly system for the making of pizzas to be sold in a retail establishment. The automated pizza assembly system may advantageously make fresh pizzas for immediate cooking and delivery to customers desiring to purchase such pizzas. Additionally, the use of the automated pizza assembly system may allow for workers at the retail establishment to perform other value added tasks while the pizza assembly is being performed in an automated manner. As a result, a better utilization of the available manpower may be realized at the retail establishment. The automated pizza assembly system may be utilized in conjunction with a computer program or the like that can command the automatic preparation of the desired quantity of pizzas with the desired toppings thereon to automatically meet actual or anticipated customer demand. Additionally, the use of an automated pizza assembly system may improve the speed at which the pizzas can be made, thereby improving throughput. The improved throughput can be especially important during rush times wherein the demand for pizzas is greater than other times.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1 and 2 are perspective views of an automated pizza assembly system according to the present disclosure;

FIG. 3 is a top plan view of the automated pizza assembly system of FIGS. 1 and 2;

FIGS. 4-6 are elevation views of the automated pizza assembly system of FIGS. 1 and 2;

Figure 8:
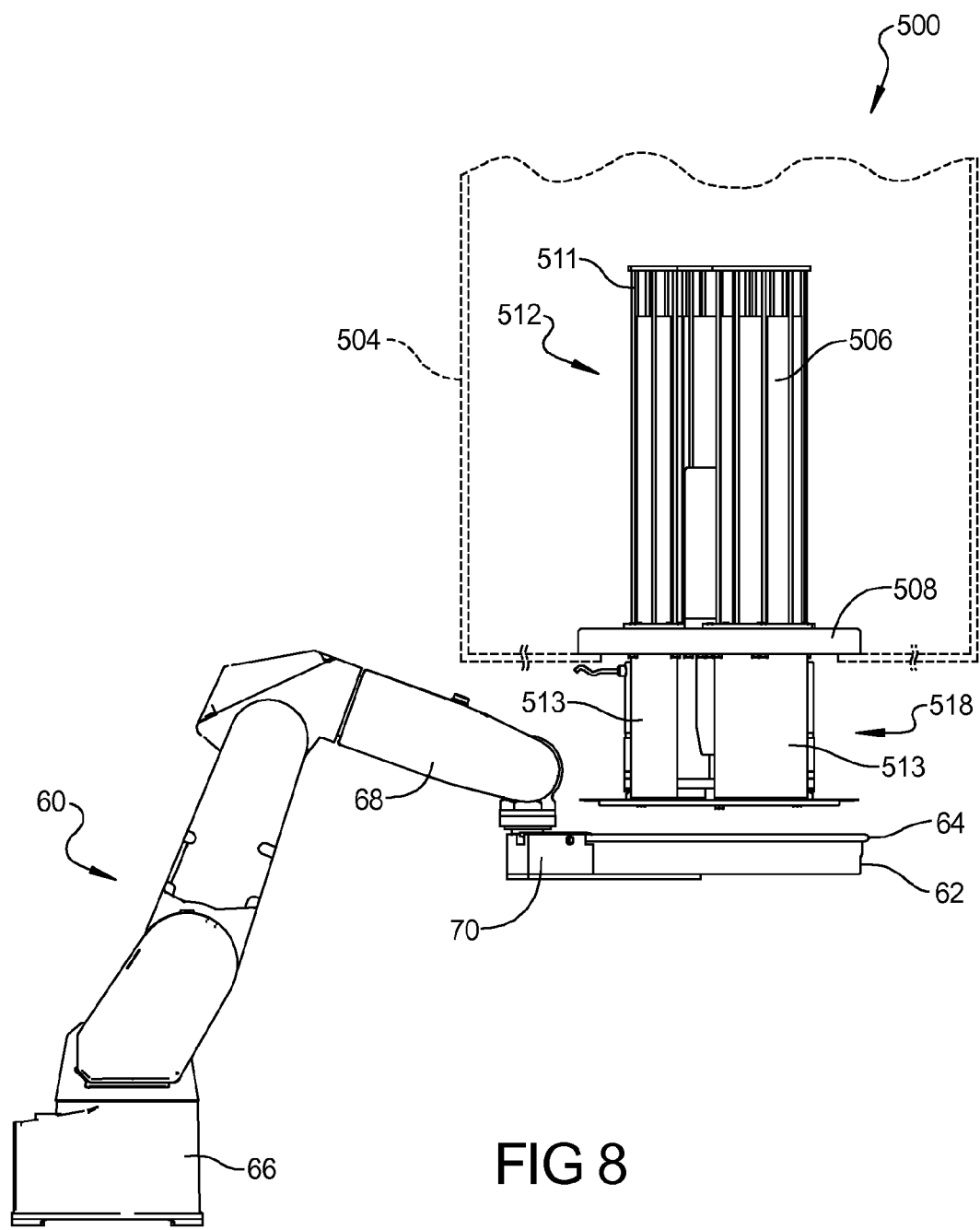
FIG. 8 is a side view of the pepperoni station according to the present disclosure.
Figure 9:
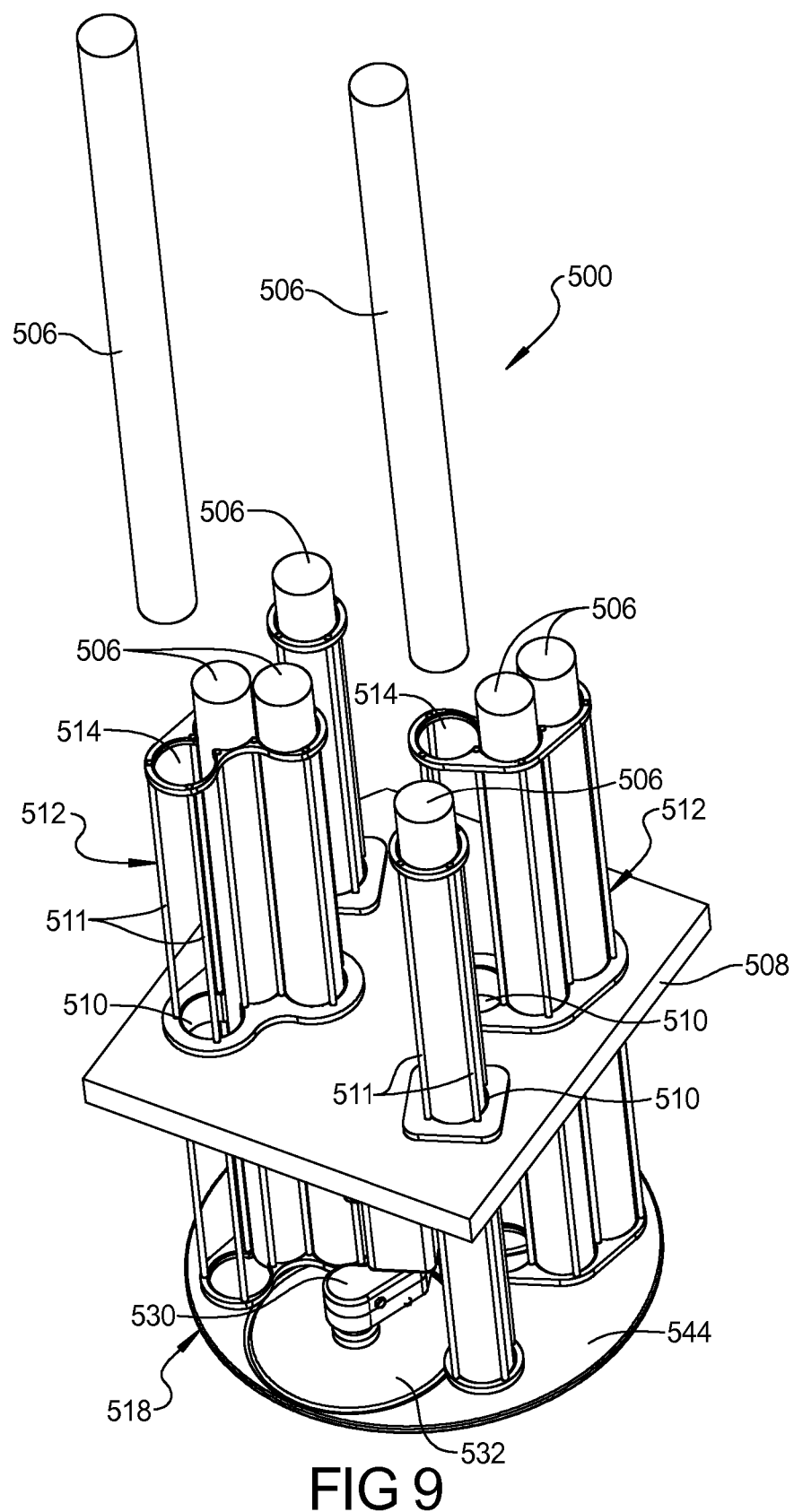
FIG. 9 is a perspective view of a portion of the pepperoni station showing the insertion of pepperoni sticks therein.
Figure 10:
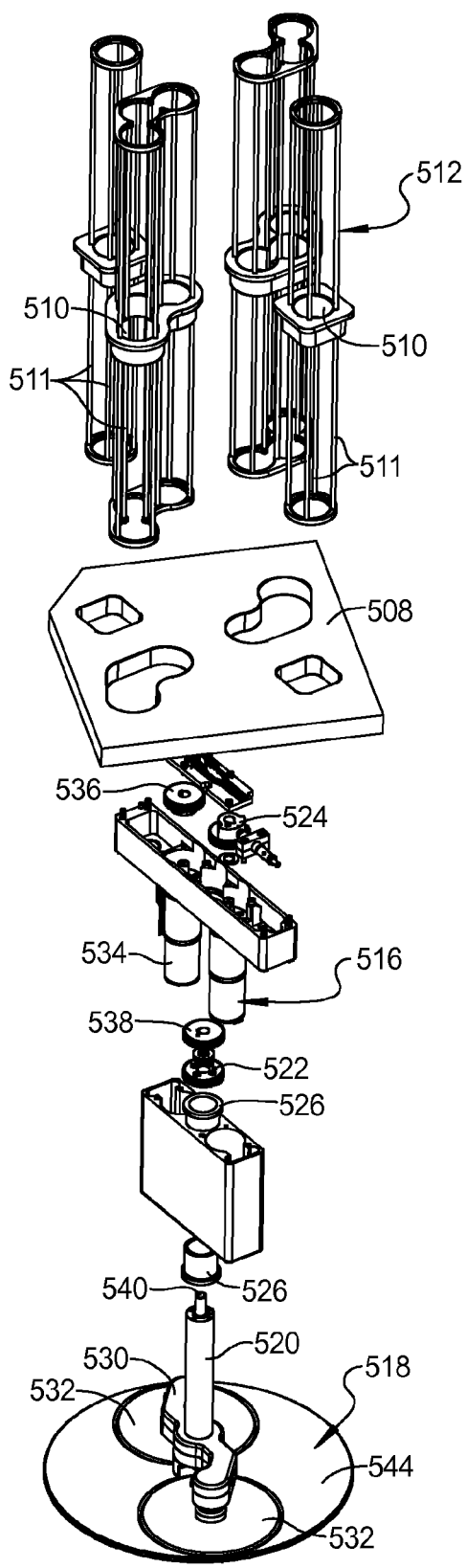
FIG. 10 is an exploded assembly view of the pepperoni station of FIG. 8.
Figure 11:
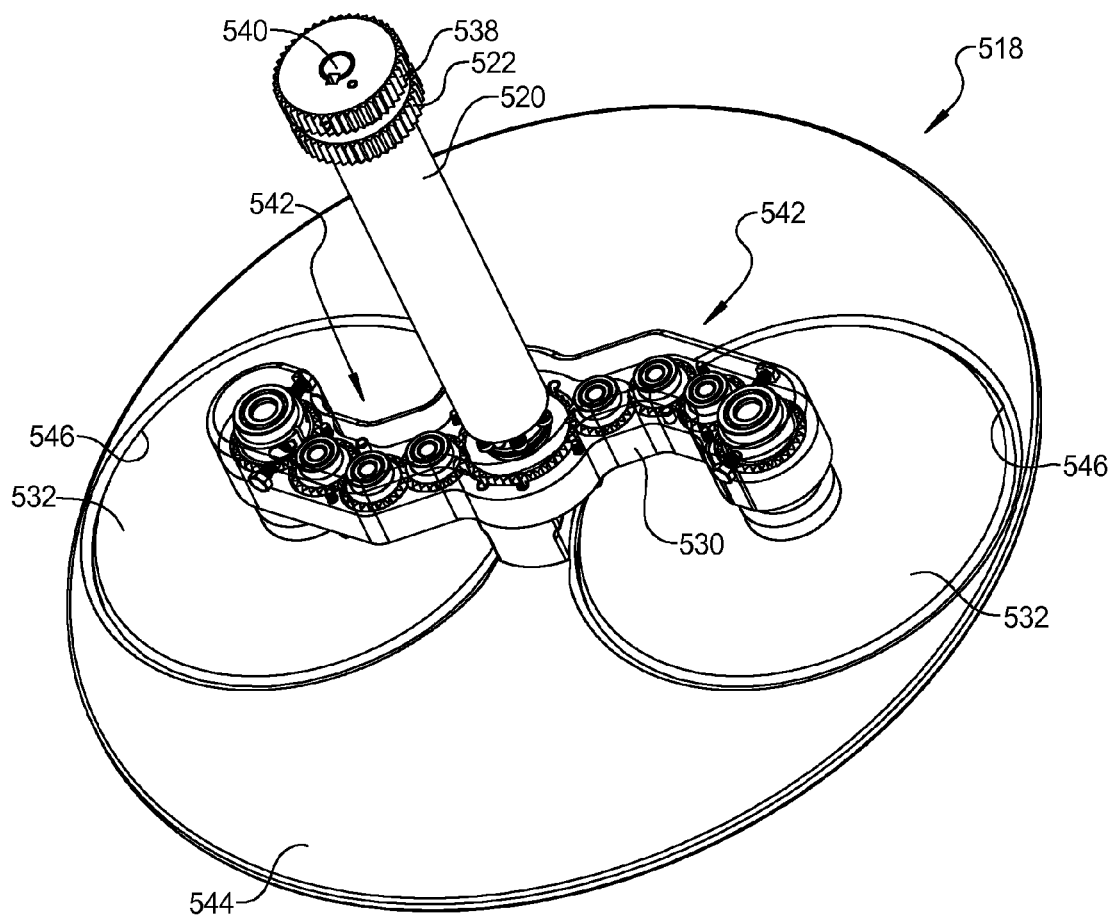
FIG. 11 is a perspective view of the slicing assembly of the pepperoni station of FIG. 8.
Figure 12:
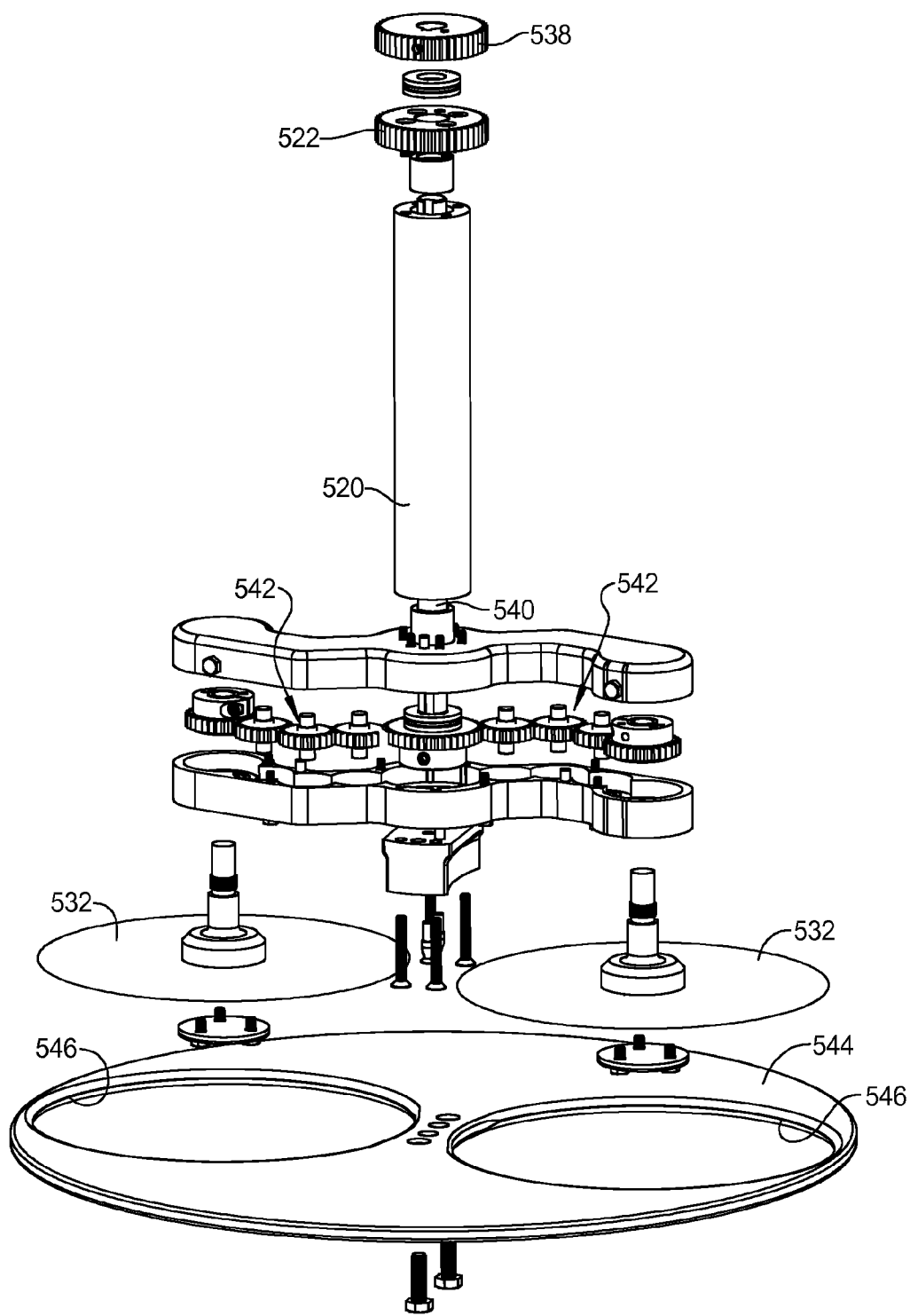
FIG. 12 is a exploded perspective view of the slicing assembly of the pepperoni station of FIG. 8.
Figure 13:
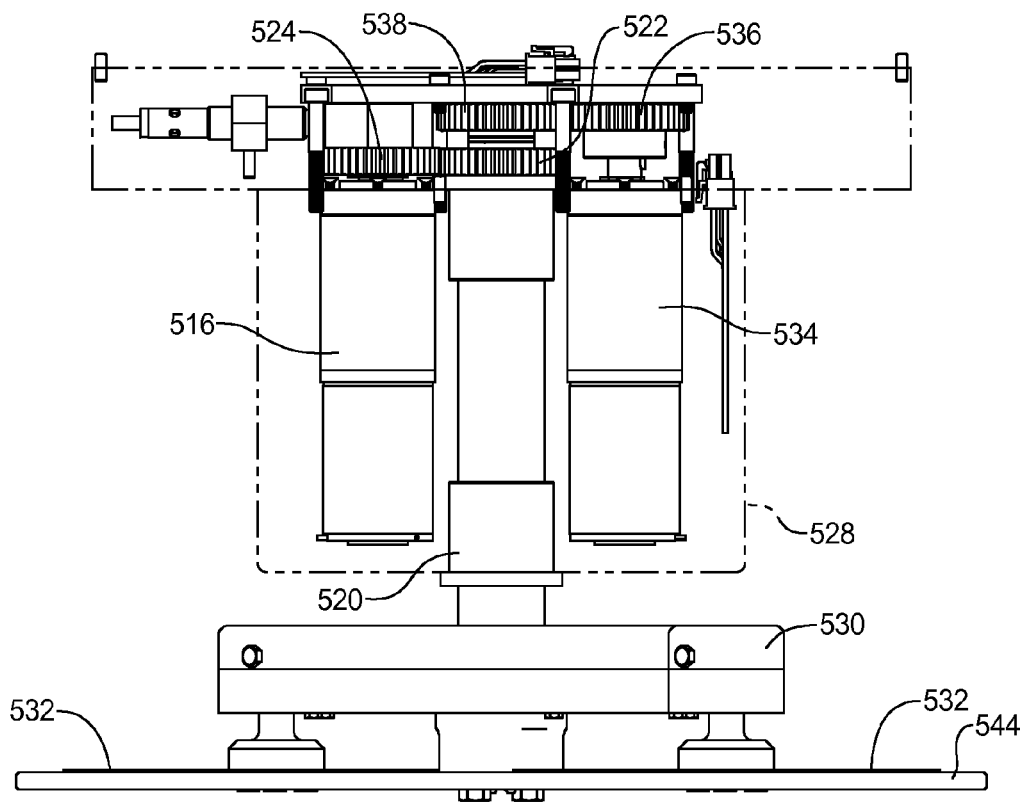
FIG. 13 is a fragmented side view of a portion of the pepperoni station of FIG. 8.
Figure 14:
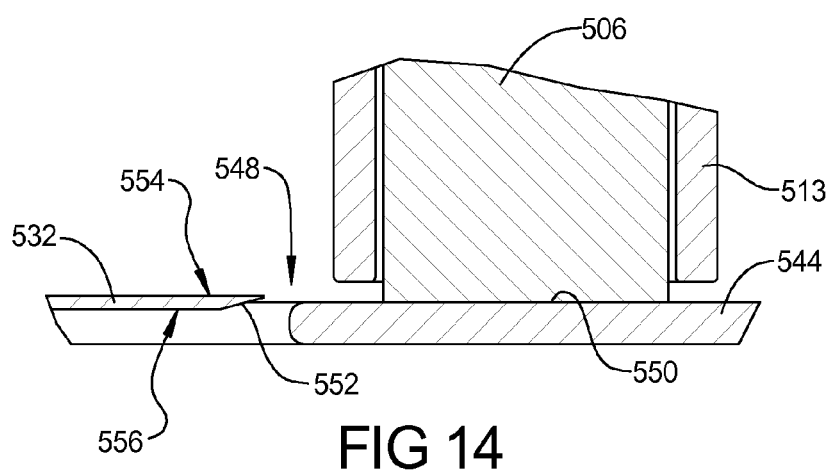
FIG. 14 is an enlarged view of a portion of the pepperoni station.
Figure 18:
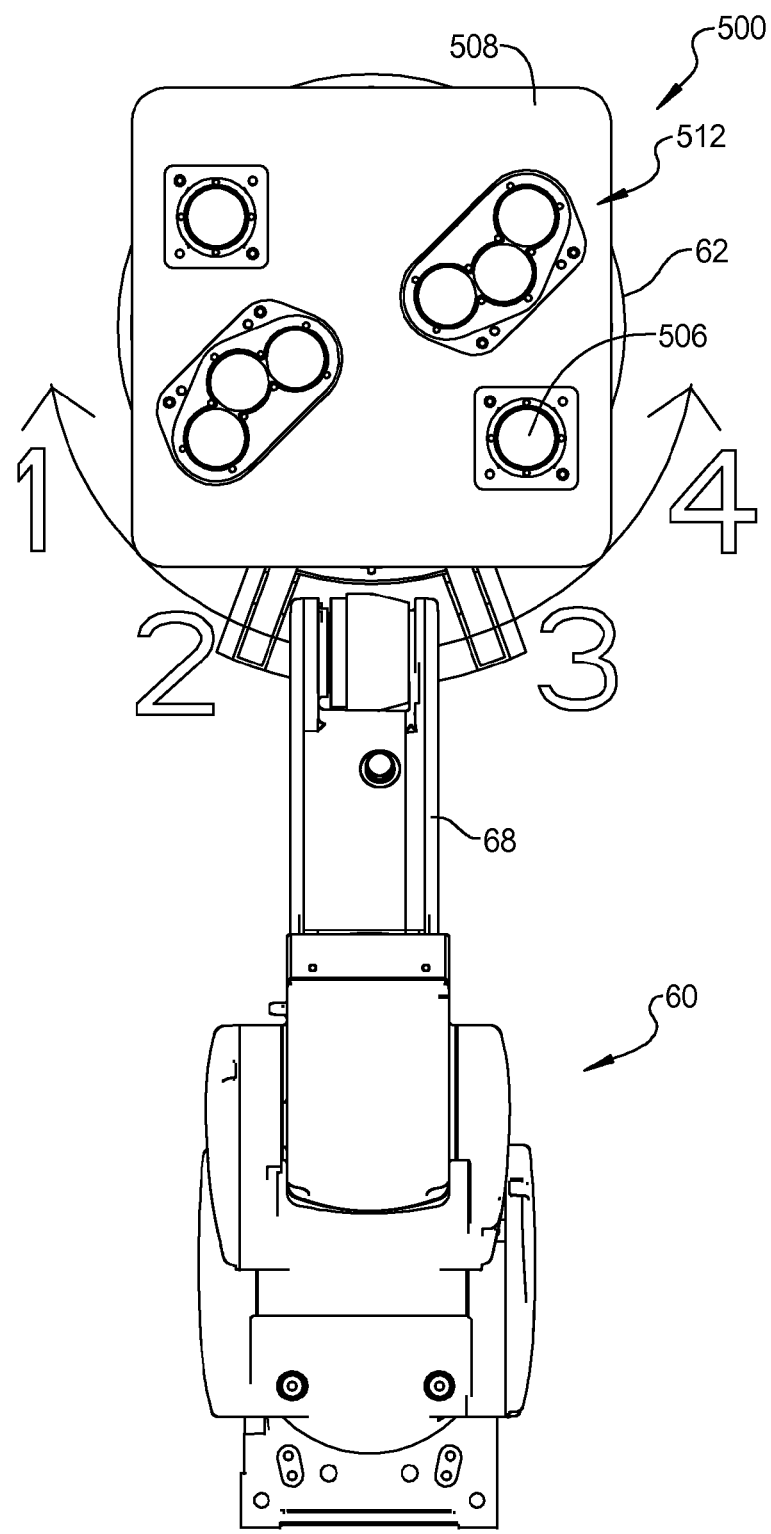
Figure 20:
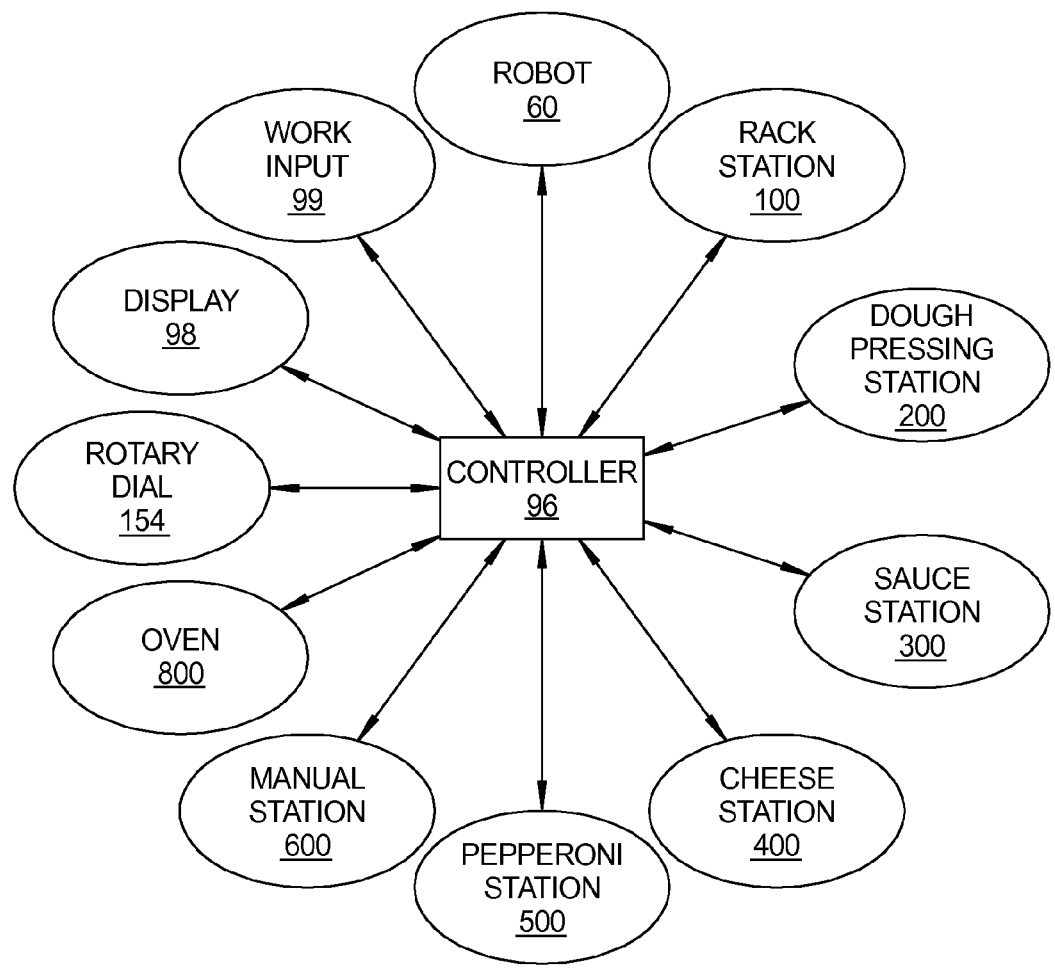
Figure 21:
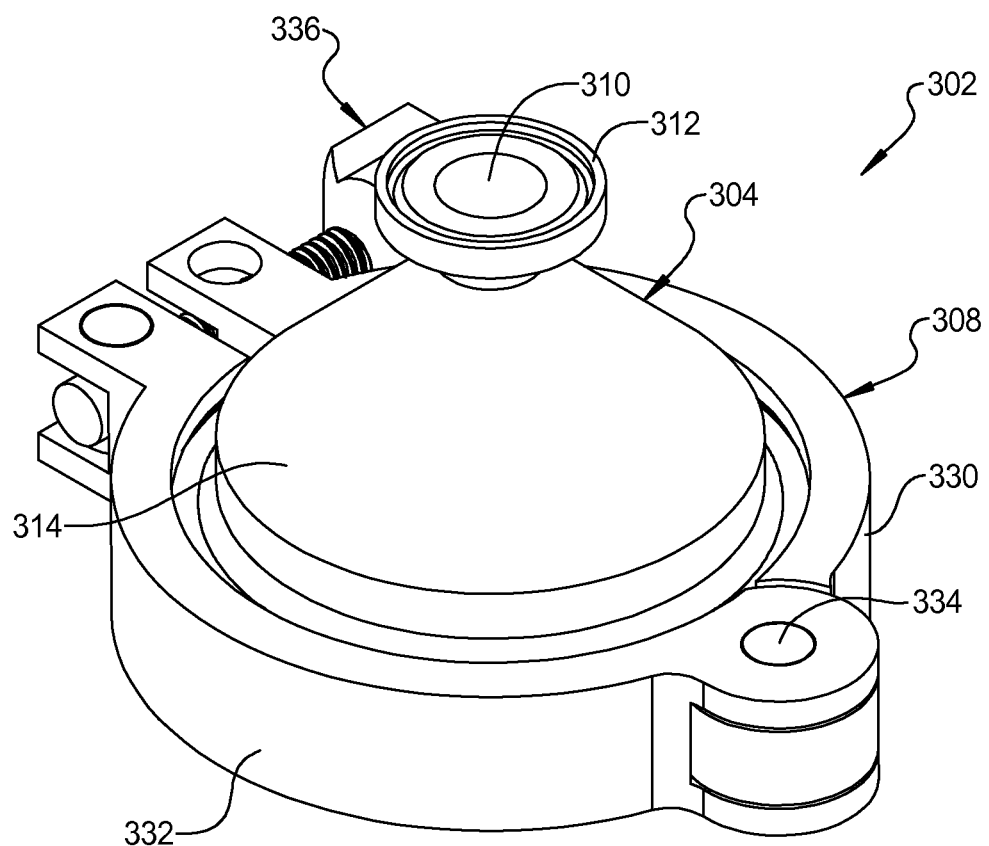
Figure 22:
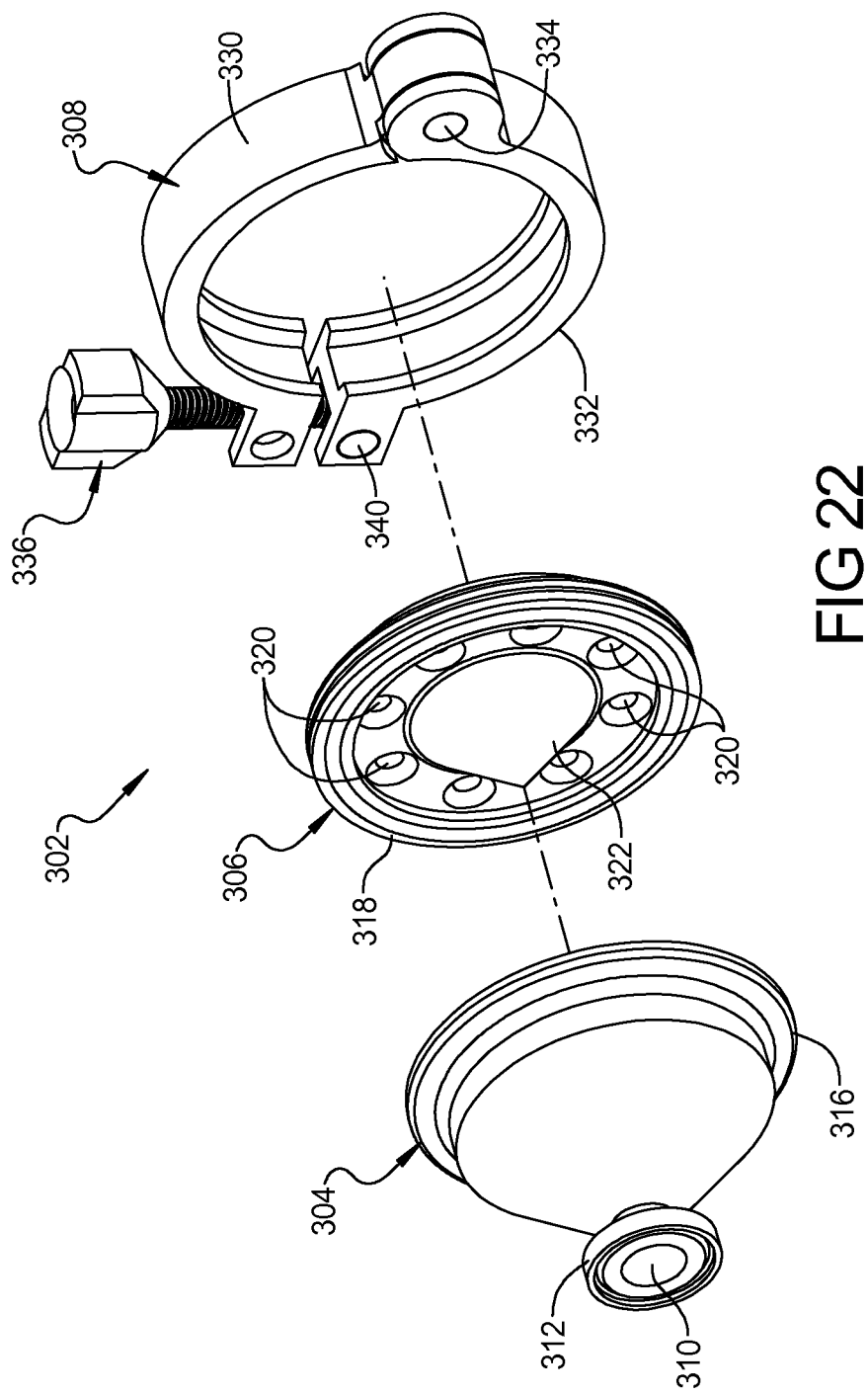
Figure 23:
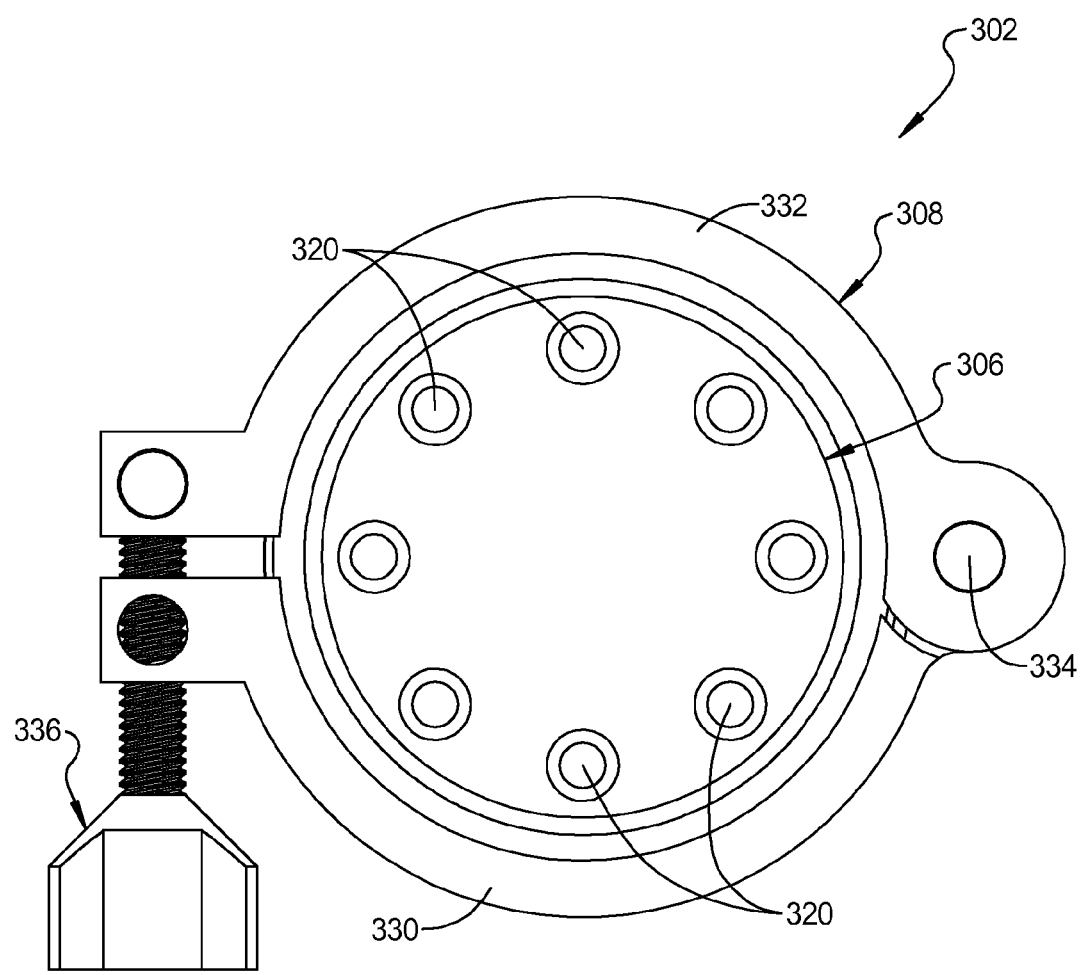
Figure 24:
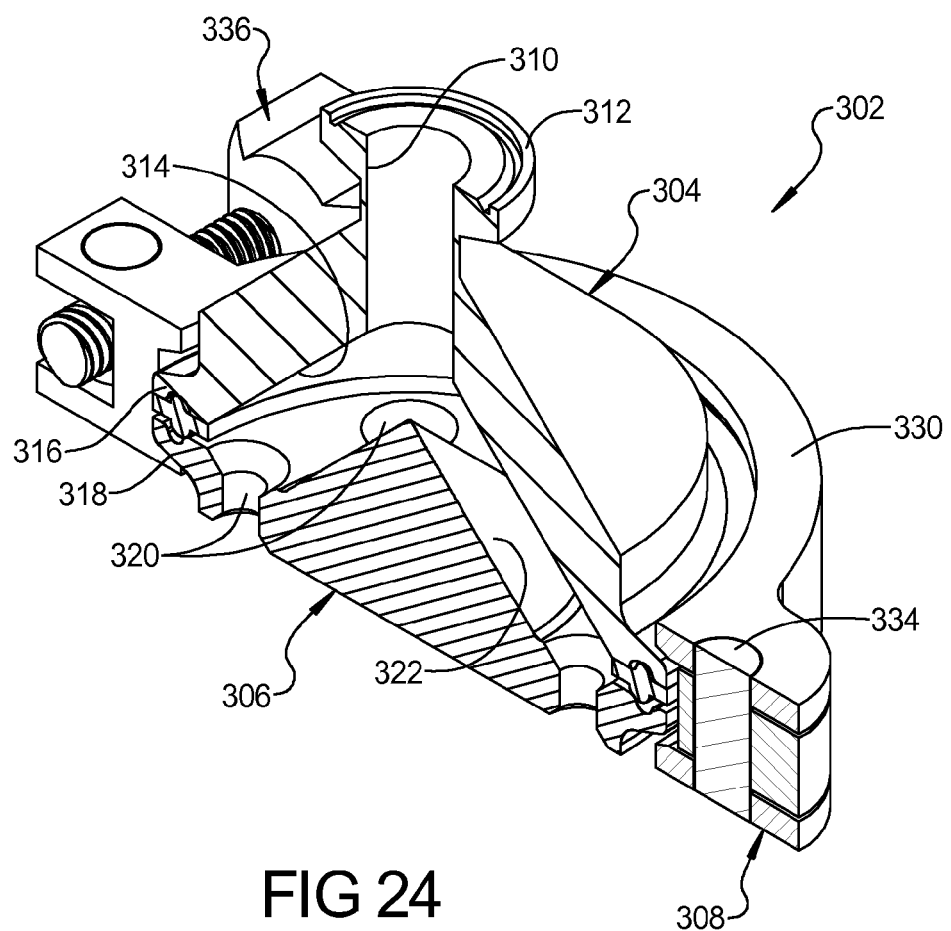
Figure 25:
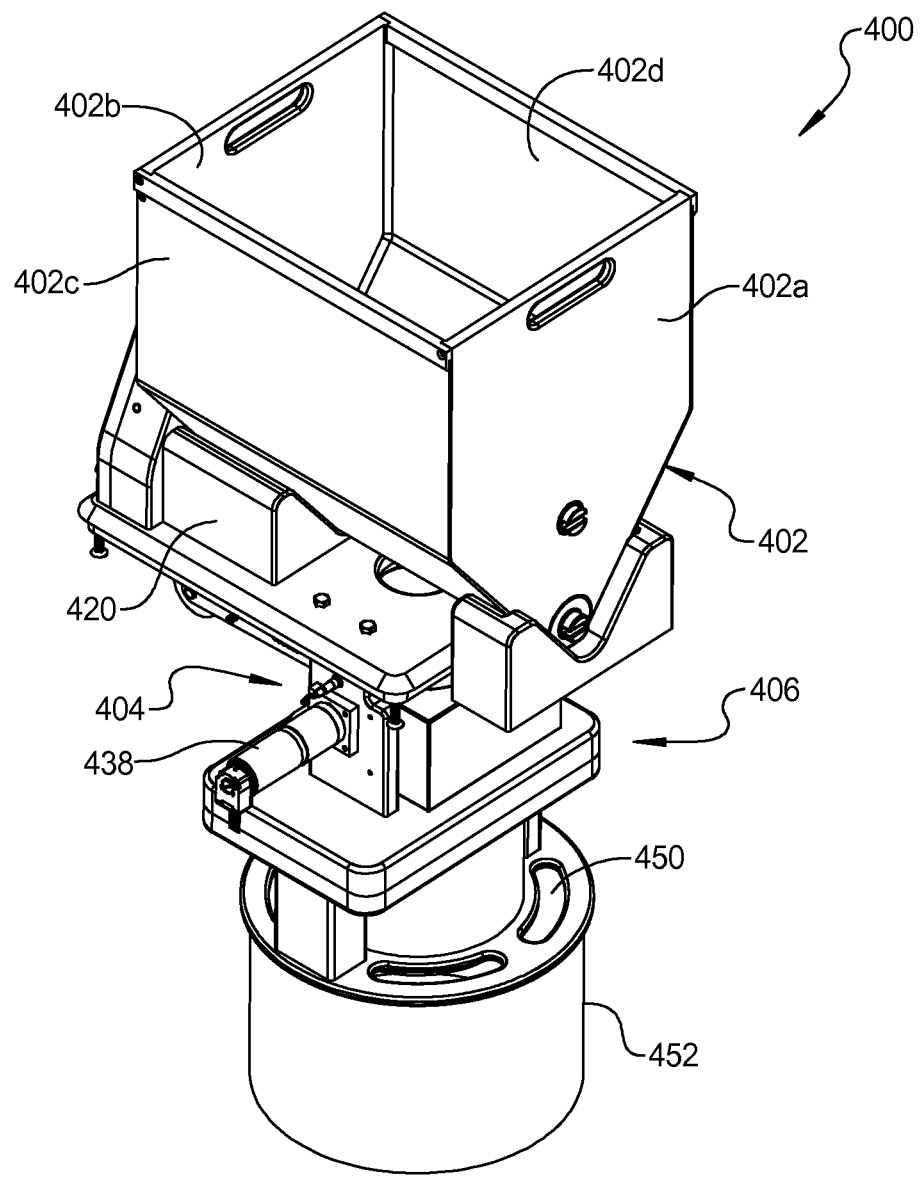
Figure 26:
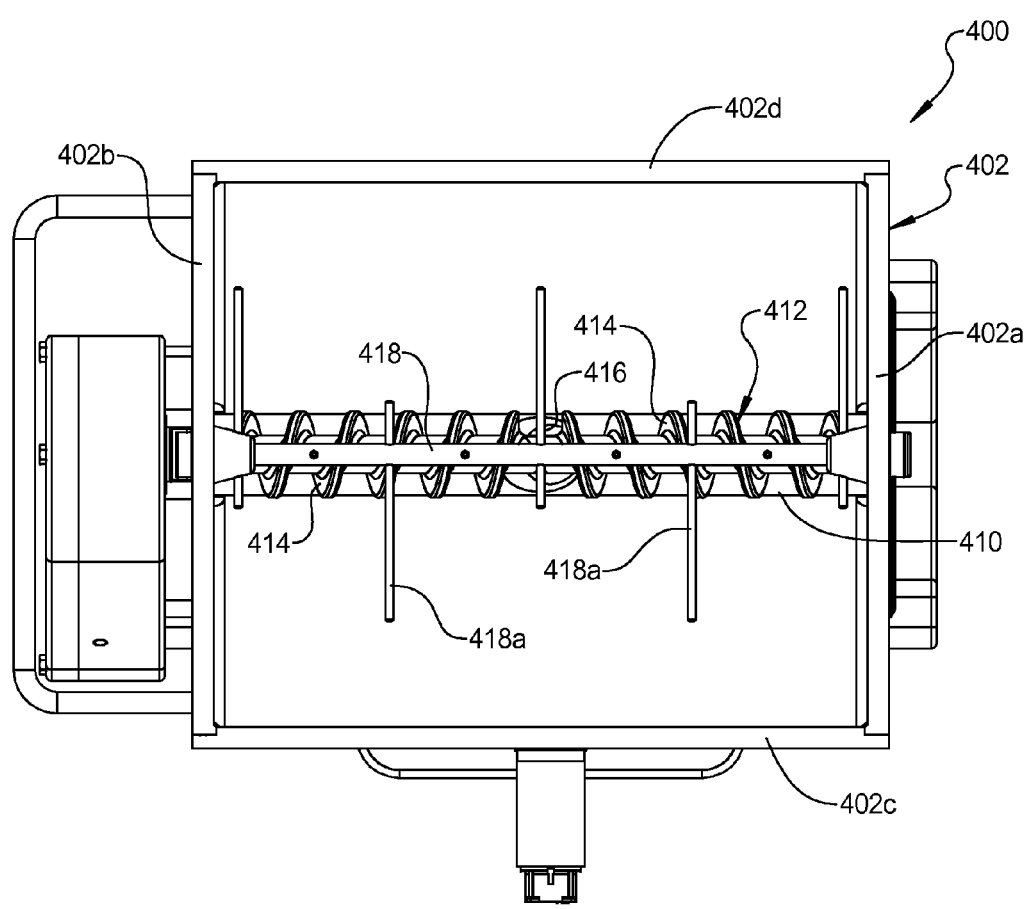
Figure 27:
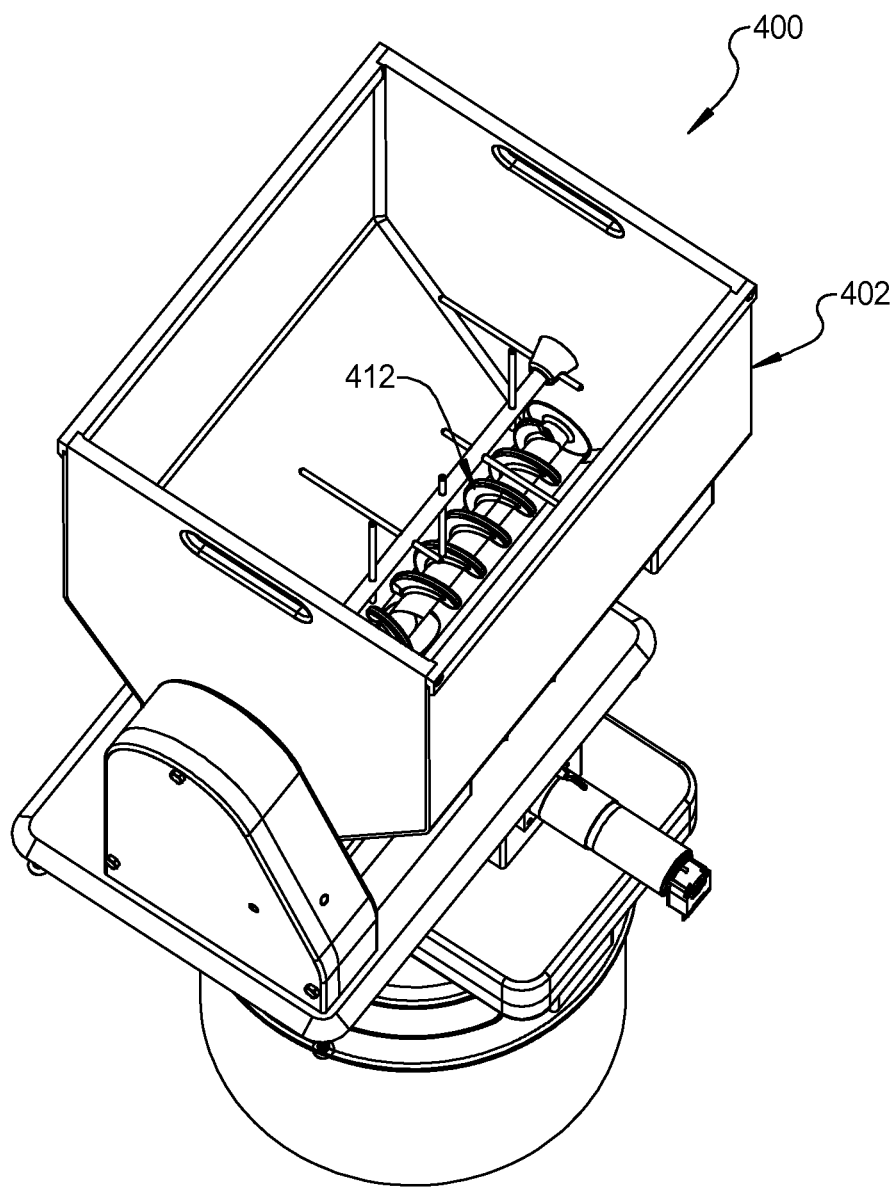
Figure 28:
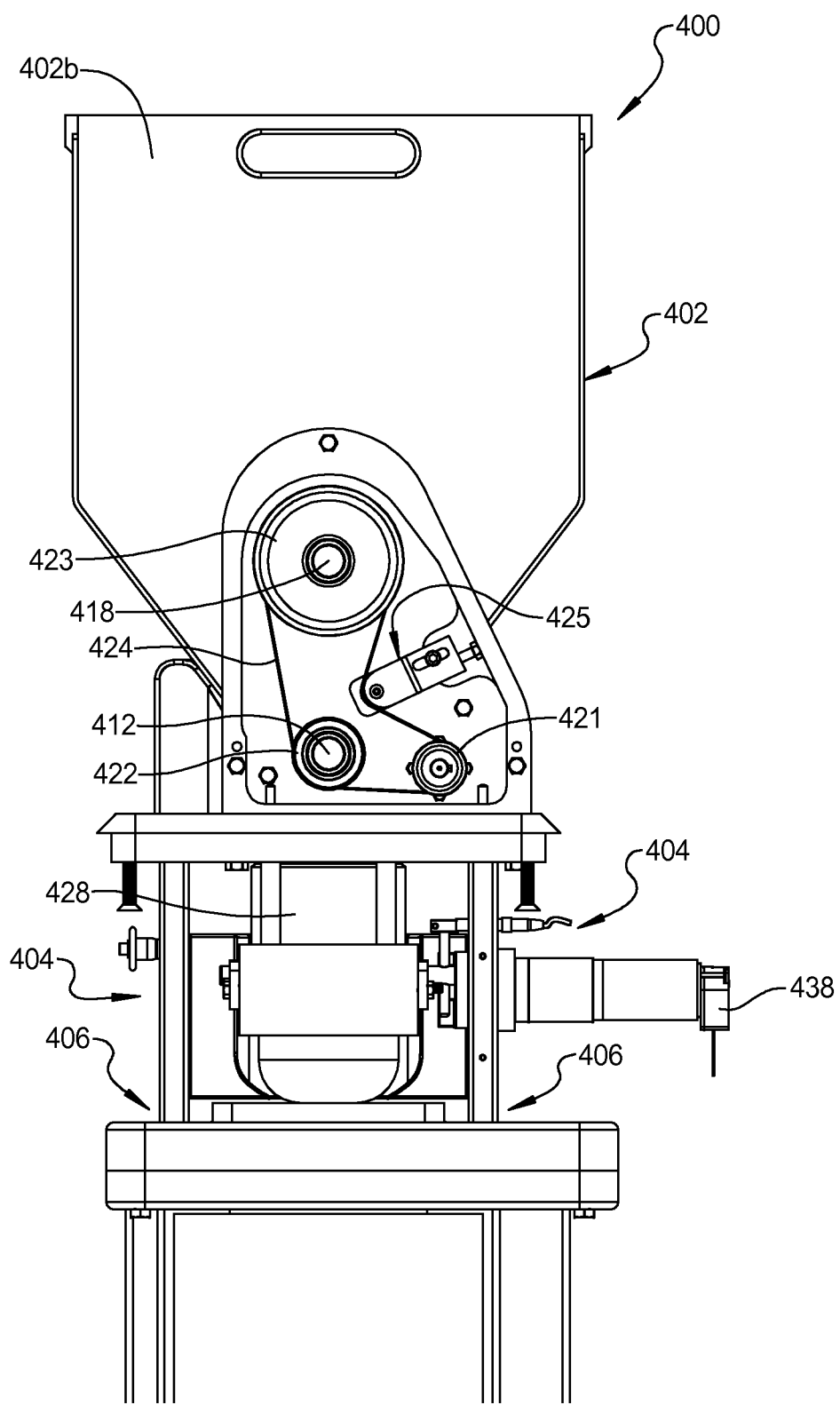
Figure 29:
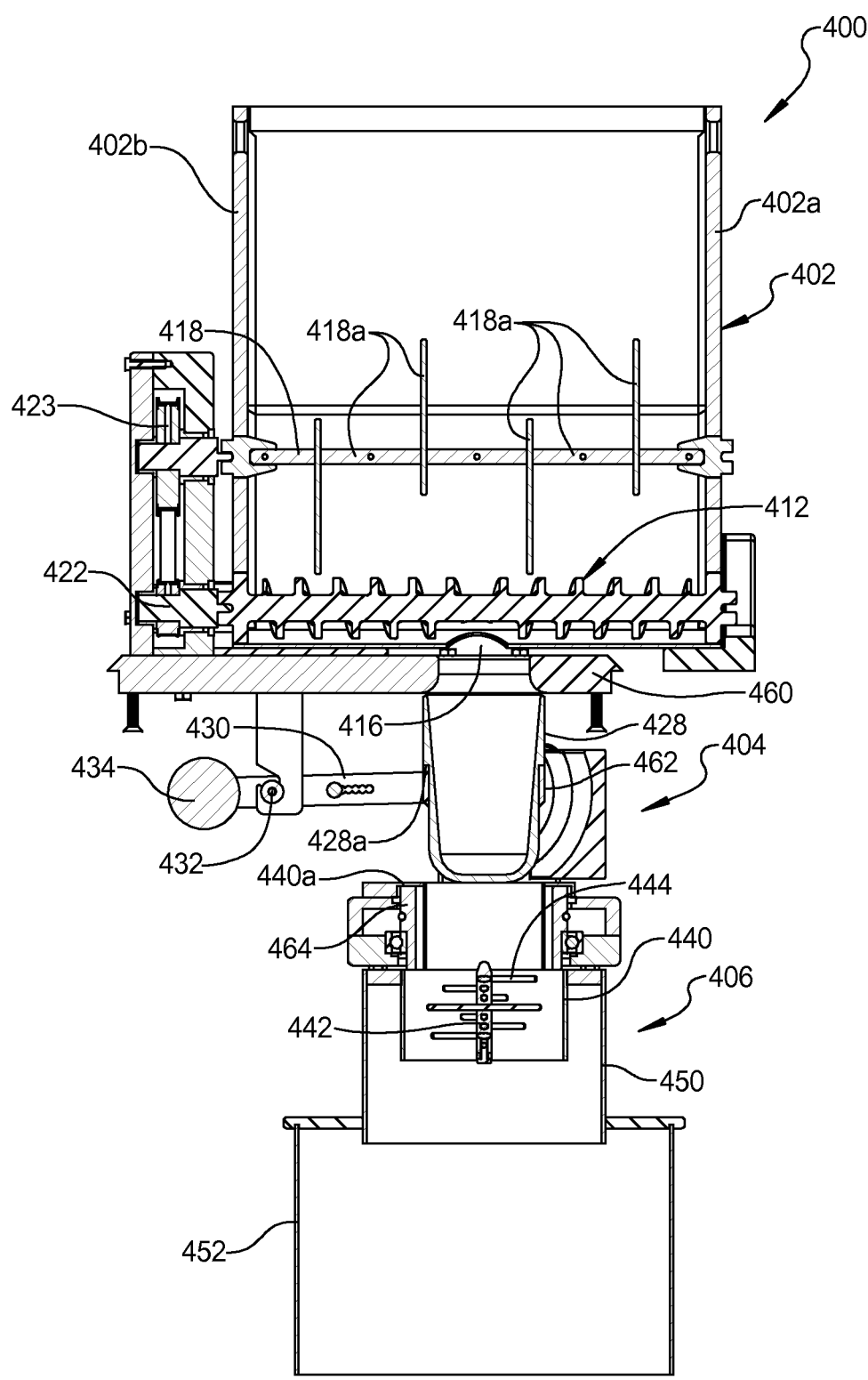
Figure 30:
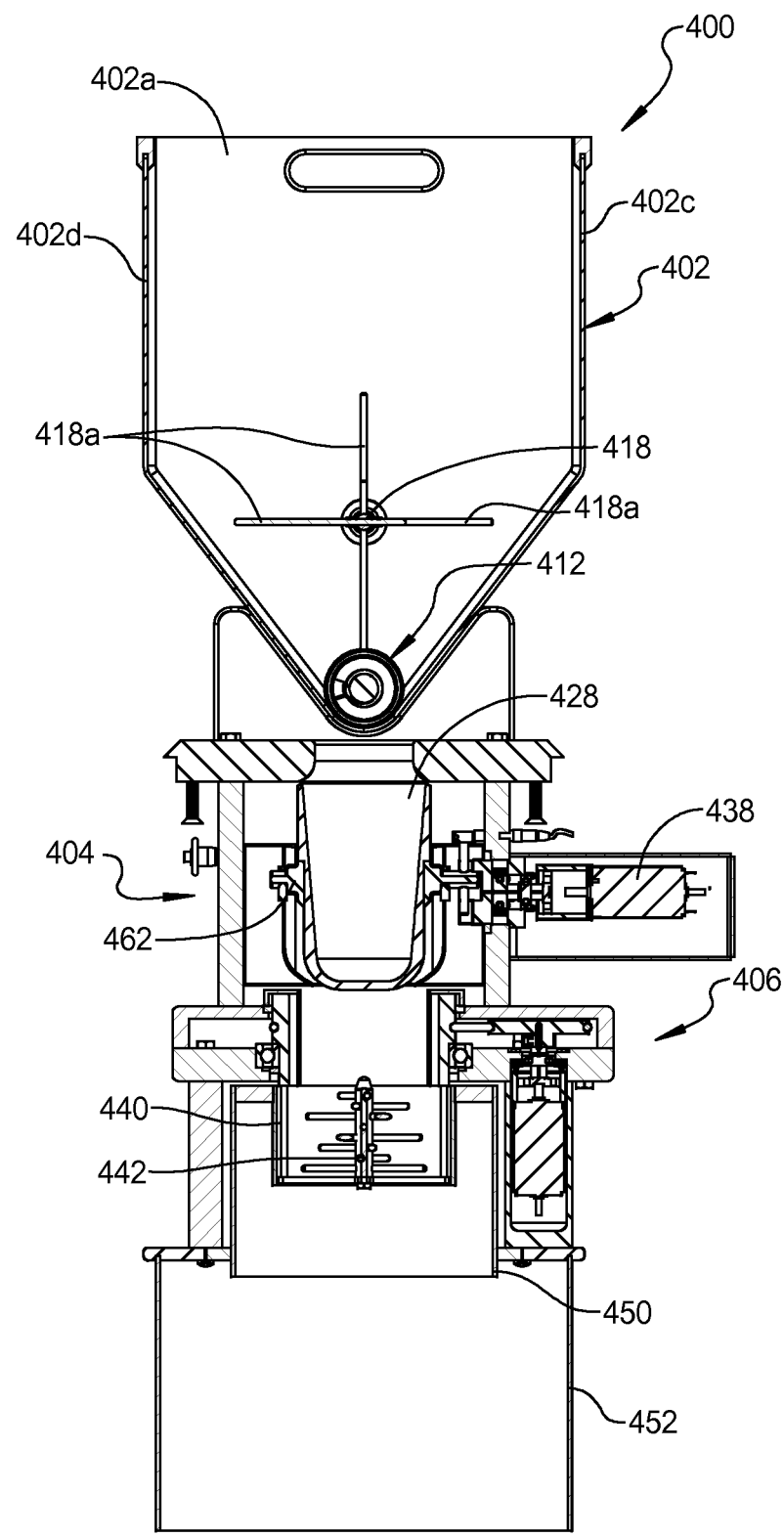
Figure 31:
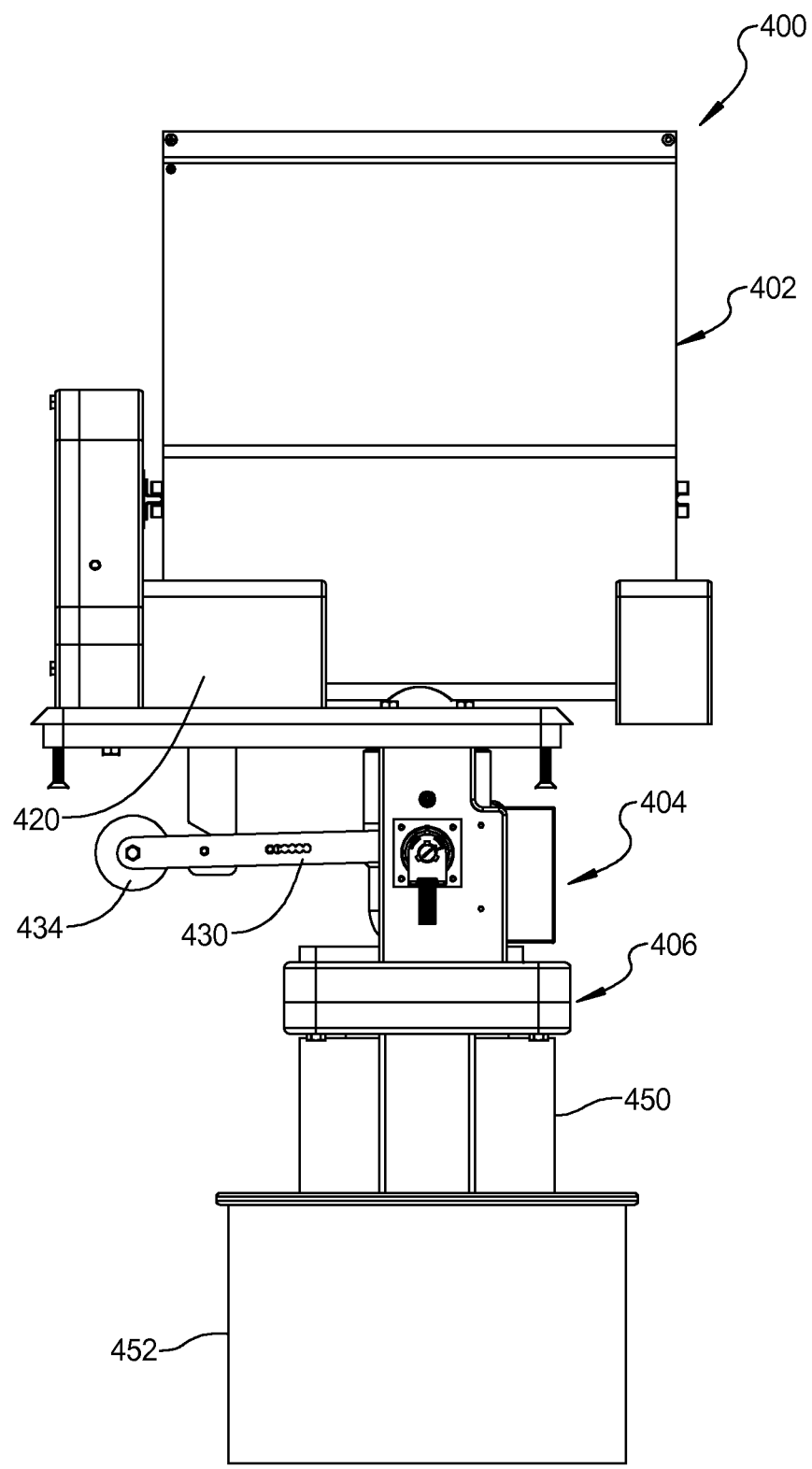
Figure 32:
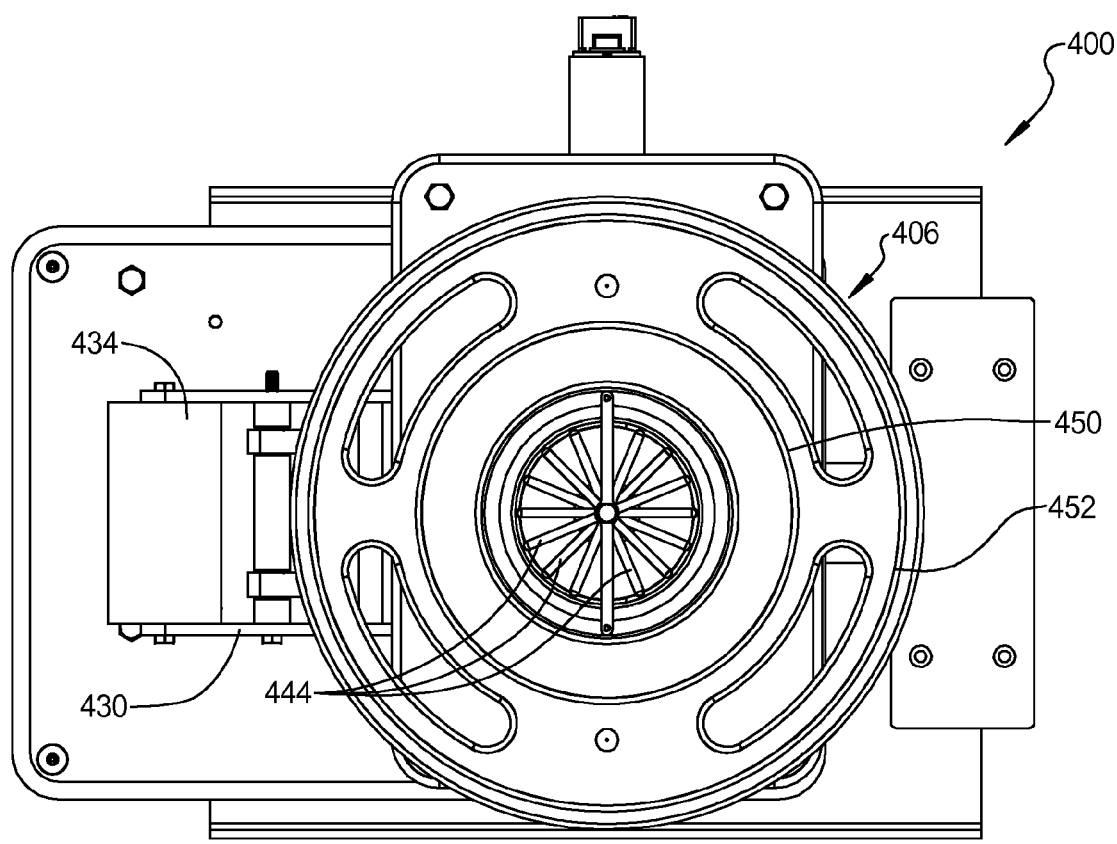
Figure 33:
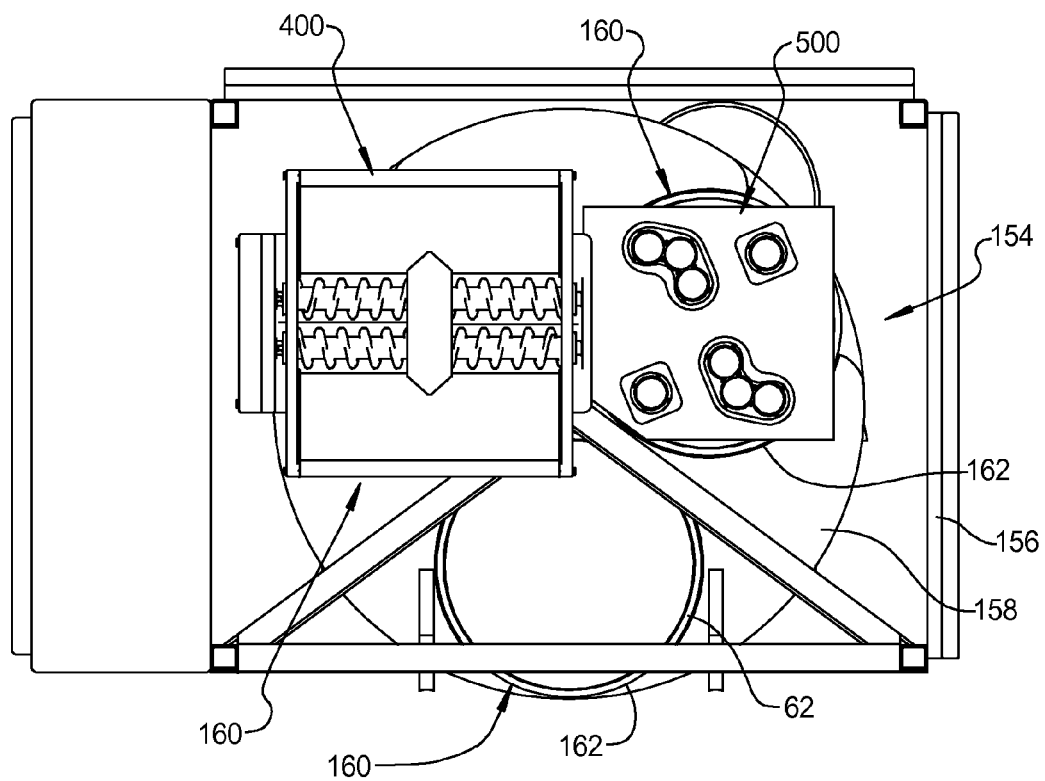
Figure 34:
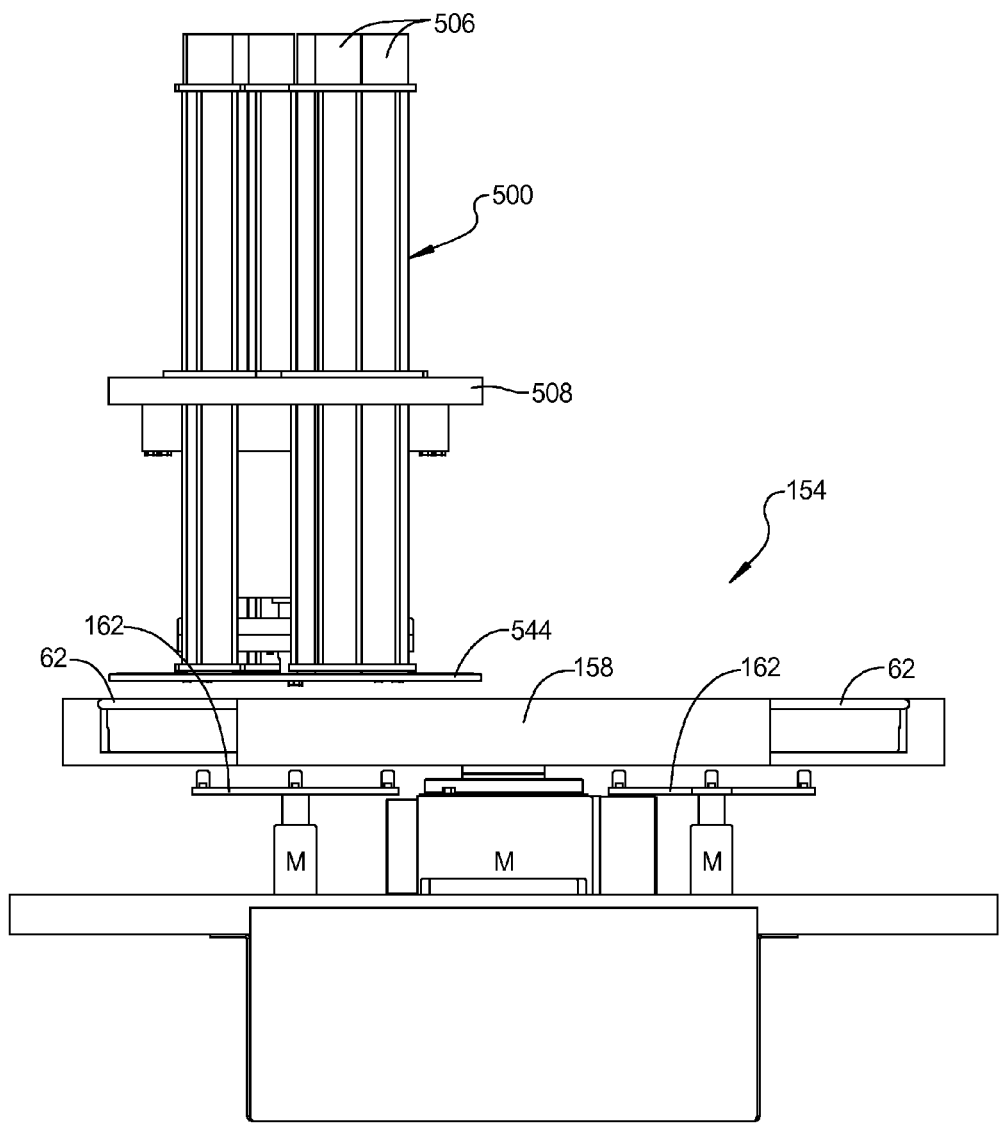
Figure 35:
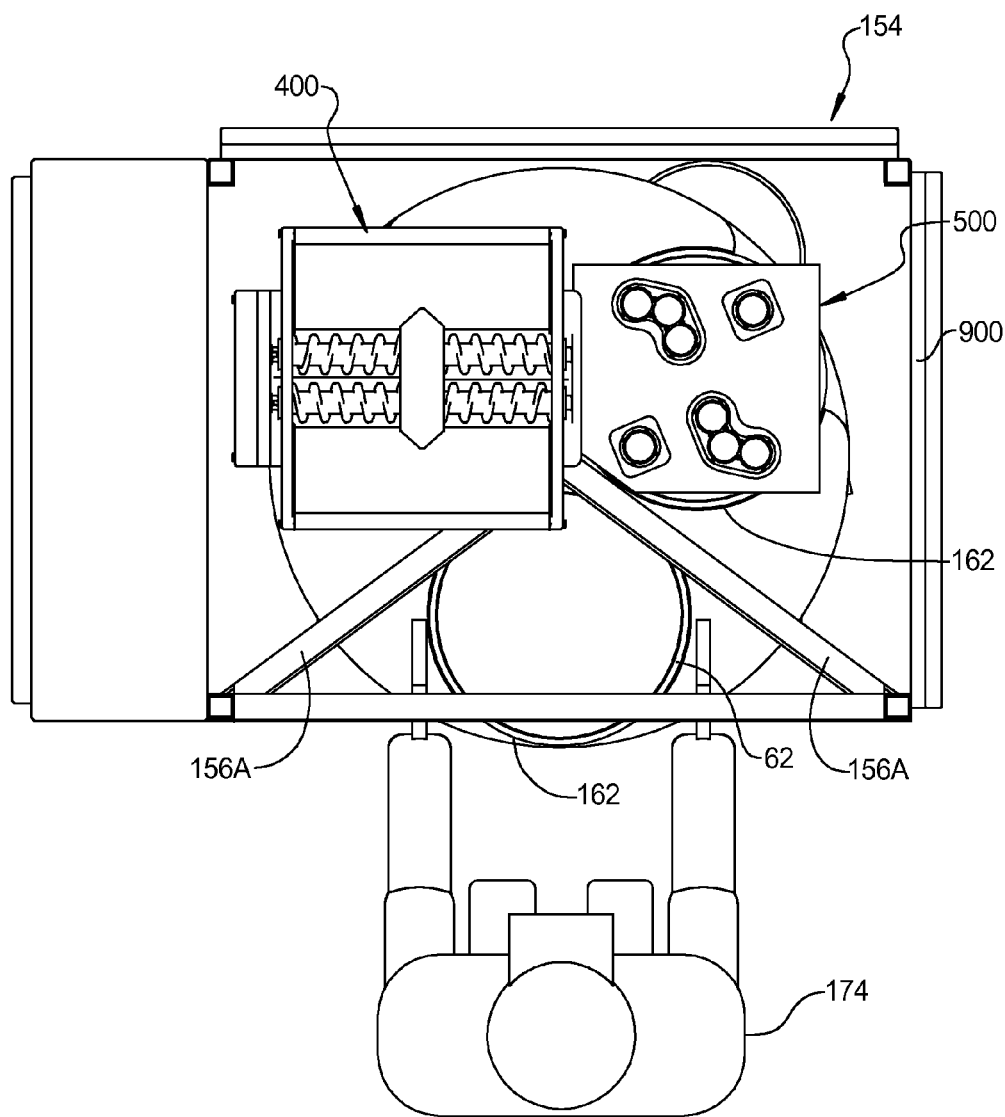
Figure 43:
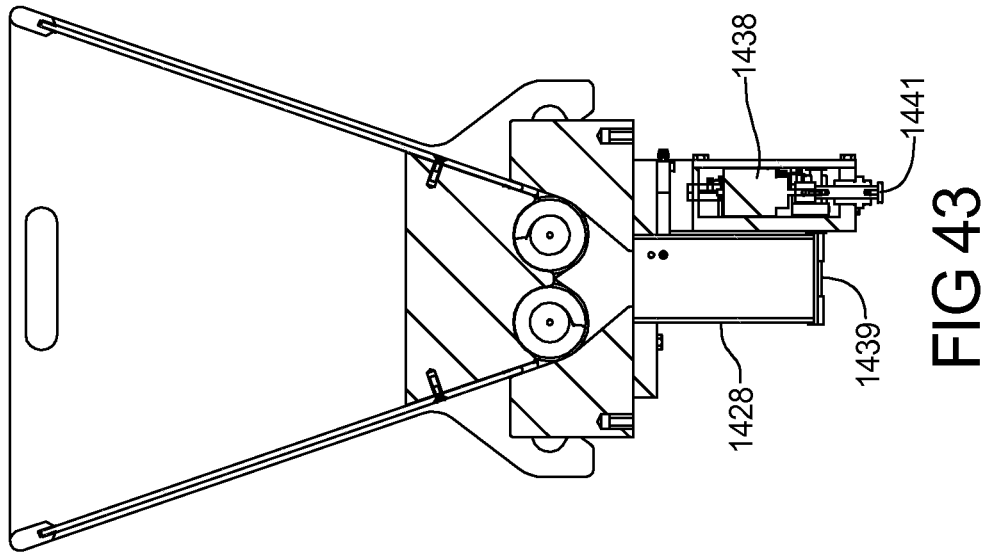
Figure 42:
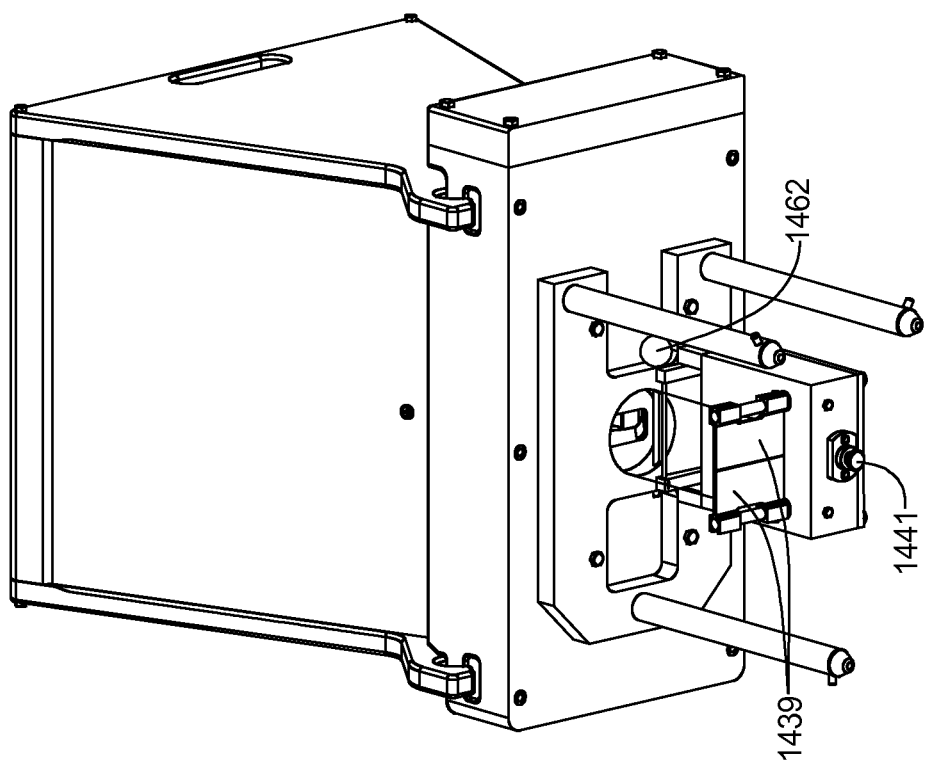
Figure 44:
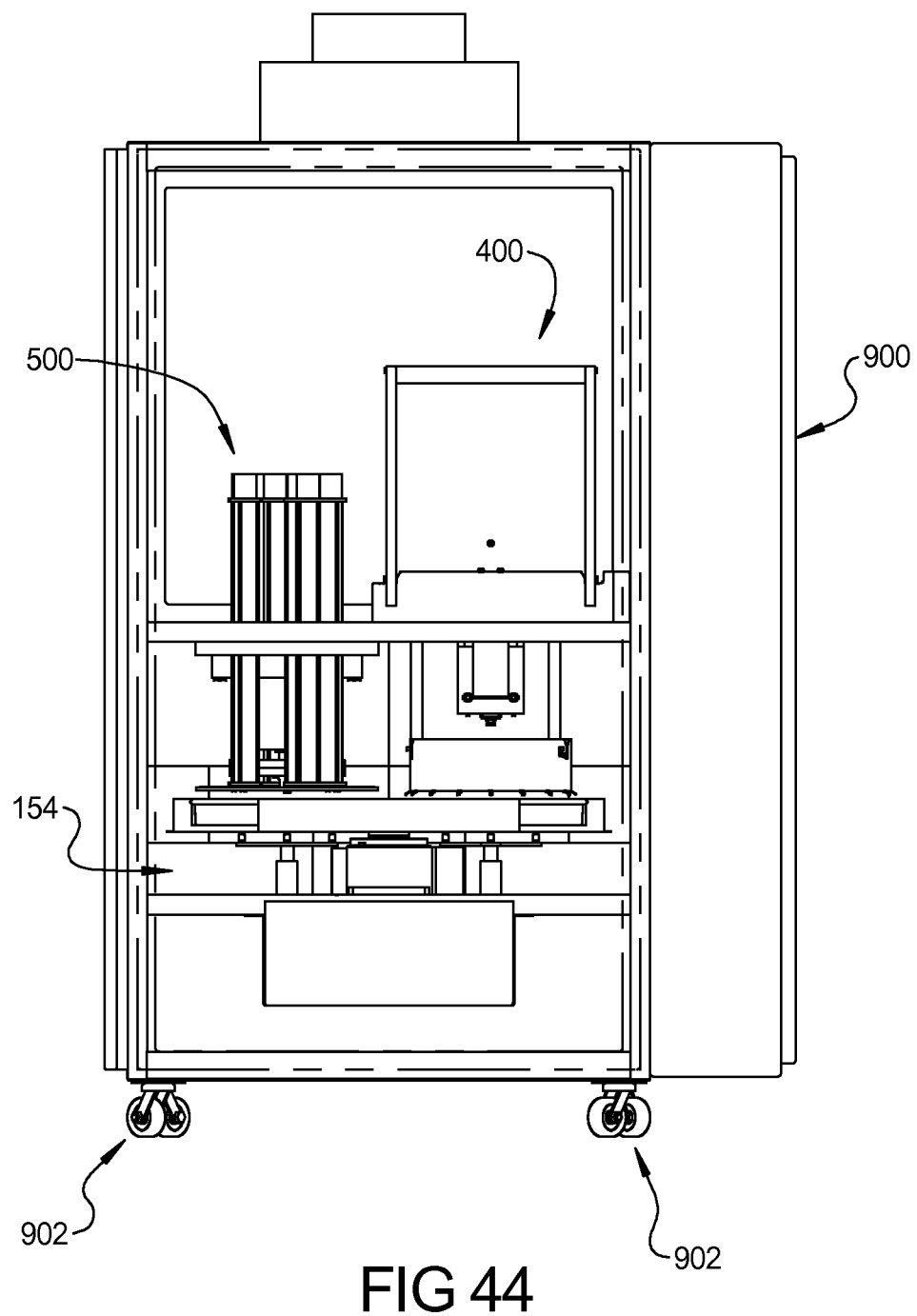
Figure 45:
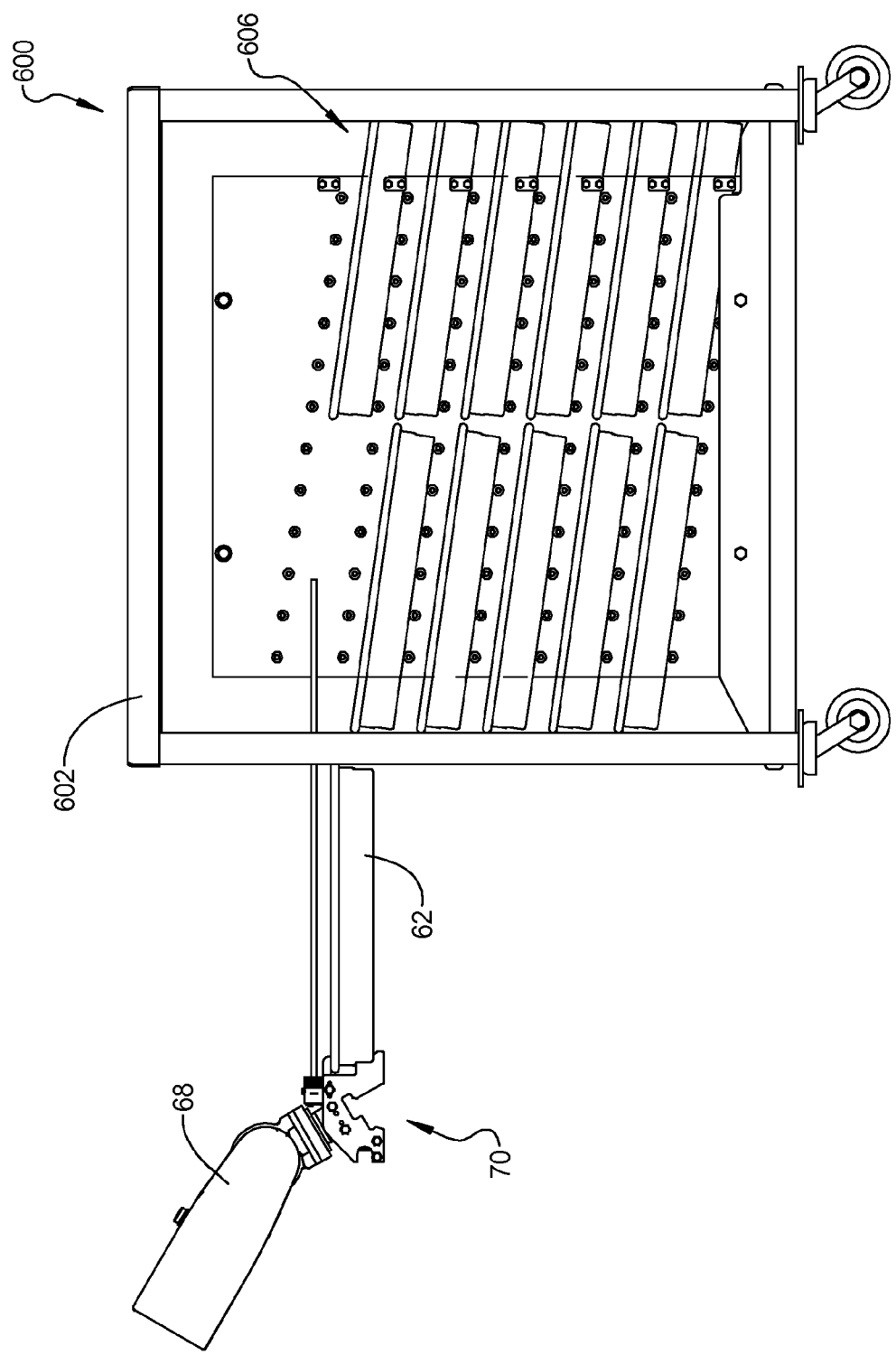
Figure 46:
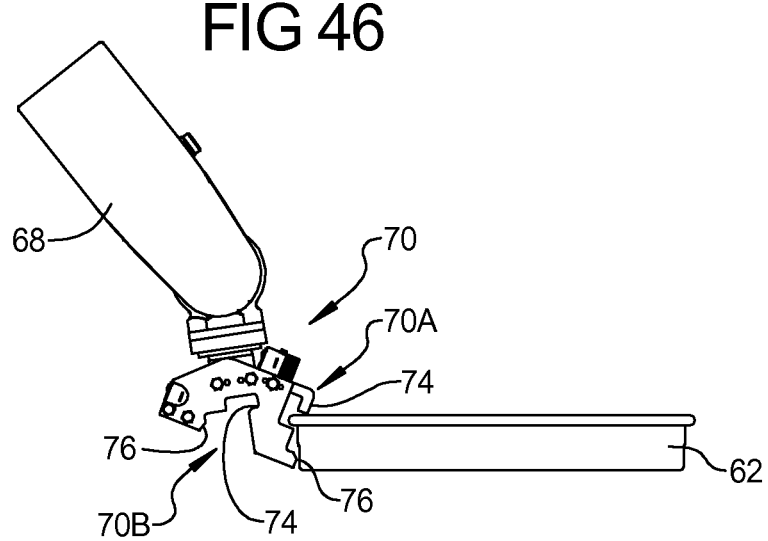
Figure 47:
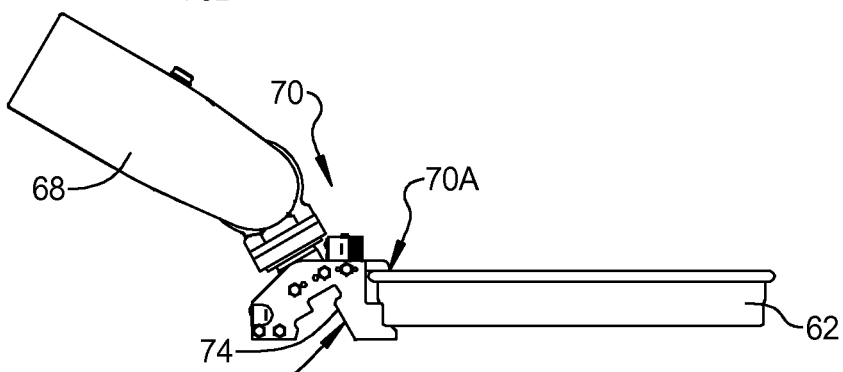
Figure 48:
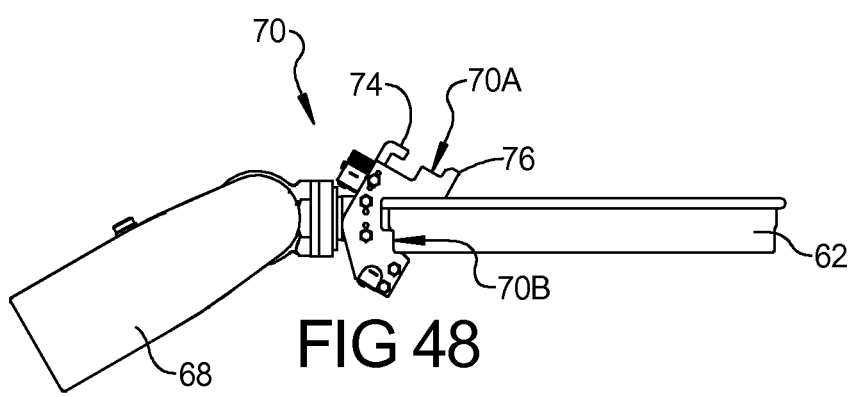
Figure 49:
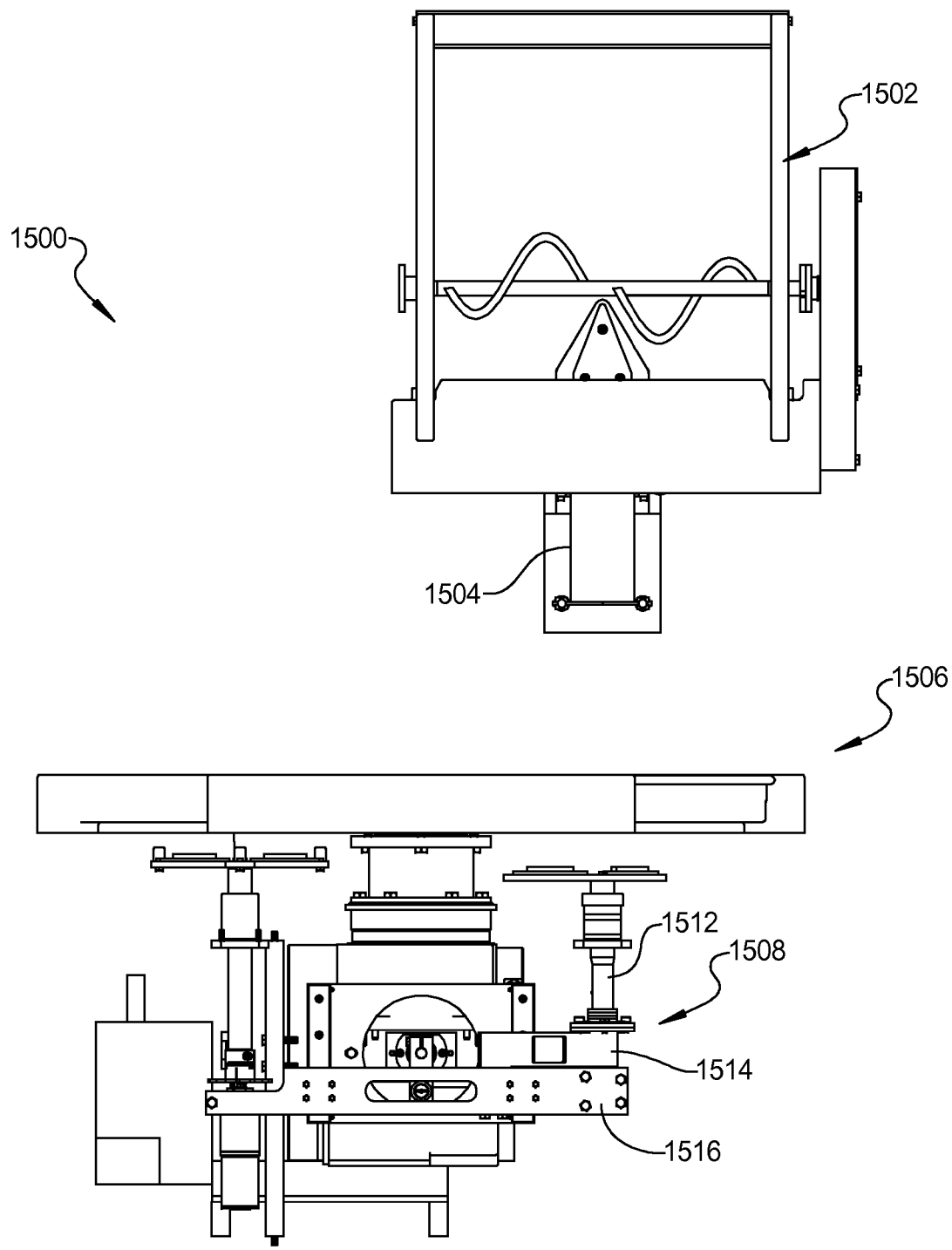

FIGS. 17A-D are bottom plan views of the pepperoni station of FIG. 8 showing the various movements of the slicing blades;

FIG. 18 is a top plan view of a portion of the pepperoni station showing the various movements in the applying of pepperonis to the pizza;

FIGS. 19A-D are top plan views of a portion of the pepperoni station showing the rotation of the pizza pan beneath the pepperoni station and the resulting pepperoni pattern achieved on the pizza;

FIG. 20 is a simplified schematic representation of a control system for the automated pizza assembly system;

FIG. 21 is a perspective view of a pizza sauce nozzle assembly according to the principles of the present disclosure;

FIG. 22 is an exploded perspective view of the pizza sauce nozzle assembly shown in FIG. 21;

FIG. 23 is a plan view of the pizza sauce nozzle assembly shown in FIG. 21;

FIG. 24 is a perspective cross-sectional view of the pizza sauce nozzle assembly shown in FIG. 21;

FIG. 25 is a perspective view of the cheese station;

FIG. 26 is a top plan view of the cheese hopper of the cheese station;

FIG. 27 is a top perspective view of the cheese station;

FIG. 28 is a detailed plan view of the cheese hopper drive assembly with a cover plate removed;

FIG. 29 is a cross-sectional view of the cheese station shown in FIG. 25;

FIG. 30 is a cross-sectional view taken along an axis generally transverse to the cross-sectional view of FIG. 29;

FIG. 31 is a front plan view of the cheese station shown in FIG. 25;

FIG. 32 is a bottom plan view of the cheese station shown in FIG. 25;

FIG. 33 is a top plan view of a rotary dial topping system according to an alternative embodiment;

FIG. 34 is a side plan view of a pepperoni station with a rotary dial system according to the embodiment of FIG. 33;

FIG. 35 is a perspective view of the rotary dial system with the cheese and pepperoni stations for use without a robot;

FIG. 36 is a side plan view of an alternative cheese station with a rotary dial system;

FIG. 37 is a perspective view of the cheese station and rotary dial system shown in FIG. 36;

FIG. 38 is an exploded perspective view of a portion of the cheese station of FIG. 36;

FIG. 39 is a top plan view of the hopper of the cheese station;

FIG. 40 is a partially cut-away side plan view of the cheese station of FIG. 36;

FIG. 41 is a detailed cut-away view of the volumetric measuring device of the cheese station of FIG. 36;

FIG. 42 is a bottom perspective view of a portion of the cheese station of FIG. 36;

FIG. 43 is a cross-sectional view of cheese station of FIG. 36;

FIG. 44 is a side view of the rotary dial system, cheese and pepperoni stations incorporated into a refrigeration module according to the principles of the present invention;

FIG. 45 is a side plan view of the manual station rack system and robot arm;

FIGS. 46-48 are side plan views of the gripper of the robot arm engaging the pan in various orientations; and FIG. 49 is a schematic side view of an alternative cheese station according to the principles of the present disclosure.

Corresponding reference numerals indicate corresponding parts throughout the several views of the drawings.

DETAILED DESCRIPTION

Example embodiments will now be described more fully with reference to the accompanying drawings.

Referring to FIGS. 1-6, an exemplary automated pizza assembly system 50 according to the present disclosure is shown. System 50 allows for the automated custom assembly of pizzas. System 50 includes a variety of components and stations that perform various functions in the assembly process. The specific components and stations utilized in system 50 can vary depending upon the desired degree of automation in the pizza assembly process. By way of non-limiting example, system 50 may include a rack station 100, a dough pressing station (not shown), a sauce station 300, a cheese station 400, a pepperoni station 500, a manual station 600, an oven conveyor system 700 and/or an oven 800 (see FIG. 3). A monitor and/or a control panel 52 can be provided in the manual station 600 to provide instructions for adding toppings to a pizza.

System 50 may also include a robot 60 that is operable to move a pizza pan 62 between the various stations, as described below. One or more stations associated with system 50 (such as the sauce, cheese and pepperoni stations) may be disposed within a refrigerated compartment 900 to provide a controlled environment to maintain the food product therein at a desired temperature or other environmental conditions. Robot 60, as shown in FIG. 8, may include a stationary base 66 and an articulating arm 68. Arm 68 can be comprised of a plurality of segments that allow articulation about various axes, as needed to provide the desired movement of pan 62. A suitable robot 60 can and may be obtained from Fanuc Robotics America, Inc. of Rochester Hills, Mich. Robot 60 includes a gripper 70 attached to the end of arm 68. Gripper 70 is operable to grip pan 62 to allow robot 60 to move pan 62 throughout the various stations of system 50. In some embodiments, base 66 may be movable along tracks within system 50 to provide additional range of motion.

Rack system 100 may include multiple racks 104 that are each operable to receive multiple pans 62 in a vertically spaced apart and/or side-by-side orientation. Racks 104 may be sloped within rack station 100 such that pans inserted on the exterior of the racks are gravity fed to the interior portion 74 of system 50 so that robot 60 can remove pans 62 therefrom. The exterior of racks 104 can be facing the exterior of system 50 so that they can be loaded by a worker while system 50 is operating. In particular, with two racks 104 facing the exterior, a worker can load pans 62 with pizza dough therein into racks 104 while system 50 is operable to remove pans 62 containing dough therein from racks 104 on interior 74. In this manner, system 50 can be supplied with pans 62 with pizza dough therein without stopping the assembly of pizzas by system 50. By way of non-limiting example, twelve vertically stacked racks can be used for receiving four pans each so that the rack system 100 can have a capacity of forty-eight pans, although greater or fewer racks can be used for receiving a greater or fewer number of pans. Alternative arrangements of the rack system can be utilized including rotating racks that are rotatable for taking pans from the exterior to an interior of the system. A still further alternative can use pans that are stacked and a mechanism can be utilized to separate the bottom pan while the remainder of the stack is supported.

Figure 7:
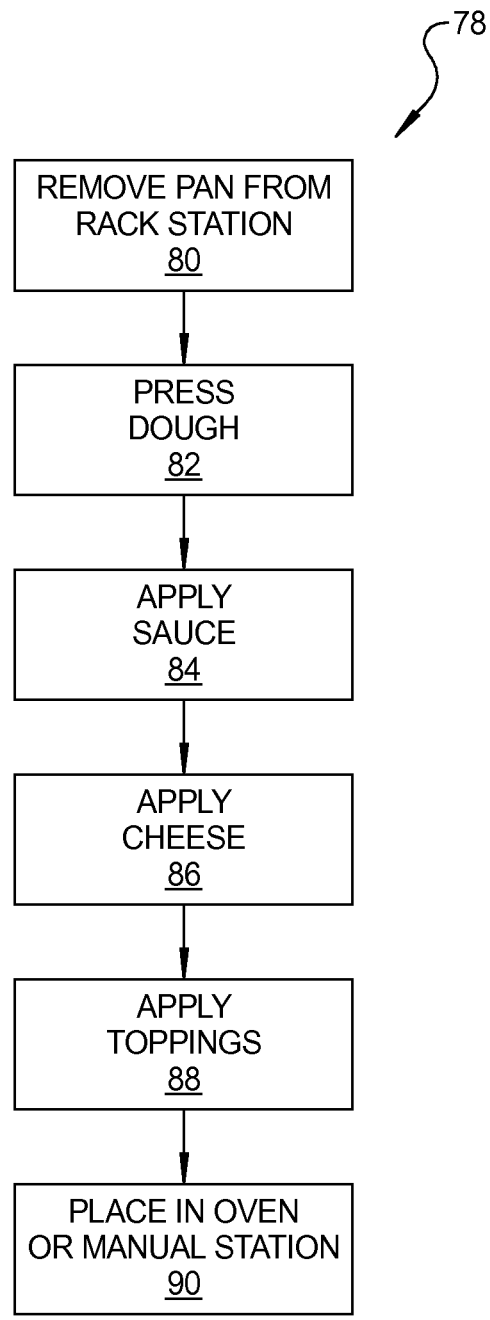
FIG. 7 is an exemplary flow chart of the steps that may be performed by the automated pizza assembly system.

Referring to FIG. 7, the steps of the pizza assembly process 78 which system 50 may undergo to make a pizza are shown. System 50 can begin by removing a pan 62 with dough therein from rack station 100, as indicated in block 80. Next, the dough within pan 62 may be pressed in an optional automated dough pressing station, as indicated in block 82. It should be appreciated that the inclusion of the automated dough pressing station is optional and that the dough within pan 62 may already be pressed prior to pan 62 being inserted into rack station 100. System 50 can move pan 62 to sauce station 300 wherein pizza sauce is supplied to the dough in pan 62, as indicated in block 84. After applying sauce, system 50 can move pan 62 to cheese station 400 wherein cheese is applied to the dough in pan 62, as indicated in block 86. After applying cheese, system 50 can move pan 62 to a topping station to apply toppings thereto, as indicated in block 88. The applying of toppings to the dough in pan 62 can be done in one or more stations. For example, pepperoni can be applied to the dough in pan 62 at pepperoni station 500. After the toppings are applied to the dough in pan 62, system 50 can place pan 62 in the oven (not shown) or on a conveyor for carrying the pizza through the oven for baking of the pizza, as indicated in block 90. Alternatively, as indicated in block 90, system 50 can place pan 62 into manual station 600. In manual station 600, a worker can apply additional toppings or perform additional tasks to the dough within pan 62 to create a desired pizza. The monitor/control panel 52 can give the worker instructions as to which toppings to add. The worker can then place pan 62 in the oven or on an oven conveyor for baking of the pizza.

Manual station 600 can include a work surface 602 and storage bins 604 containing a variety of additional toppings that may be utilized to create a customized pizza. The storage bins 604 can be refrigerated to maintain the toppings at a desired temperature. The manual station 600 can include rack storage 606 below the work surface 602 for storing prepared pizzas and awaiting the addition of specially ordered toppings. As shown in FIG. 45, the rack storage 606 can be sloped downwardly in an outward direction so that the pizza pans placed in the rack storage by the robot arm 68 are gravity fed outward to the worker standing at the manual station 600. The use of manual station 600 to apply additional toppings may allow for simplification of system 50 wherein system 50 is configured to apply a limited variety of toppings, such as those corresponding to the most common types of pizzas ordered, thereby enabling a more efficient and less complicated system 50. The limitation of the variety of toppings that can be automatically applied by system 50 may allow for a simplification of the system 50 such that a less complex and less costly system is realized.

As shown in FIGS. 45-48, the gripper 70 of the robot arm 68 can include an electronic eye-type sensor 72 that emits a light beam 74 for sensing whether a pan exists in a desired location on a rack 606 where the robot 60 is intending to place a pan 62. The gripper 70 can also include two different grip portions 70A and 70B that allow the gripper 70 to pick up a pan 62 and allow a greater amount of motion for moving pans 62. In particular, as shown in FIG. 47, the upper gripper portion 70A can be used for moving pans 62 at lower heights while the lower gripper portion 70 B which is formed generally identical to the upper gripper portion 70A and can be used to move the pans 62 to higher heights. Because the wrist portion of the arm 68 has limited mobility, the presence of upper and lower gripper portions 70A and 70B allow for a greater range of movement of the pans without adding complexity to the robot arm 68. Each gripper portion 70A and 70B is designed to be manipulated to receive the pan profile with an upper thumb portion 74 received over the upper lip of the pan 62 while a lower finger 76 is received under the pan.

A dough pressing station, when included in system 50, allows for the mechanical pressing of the dough within a pan 62. The pressing of the dough can alter the form of the dough from a ball or lump into the desired size and orientation to form a pizza within pan 62. An exemplary dough pressing system is commercially available from Rheon Automatic Machinery Co. Ltd., Machine Model PM001.

With reference to FIGS. 33 the pans 62 can be picked from the rack system 152 by a robot 60, as described previously. A pizza dough can be spread in the pan 62 prior to entry in the rack system 152. The robot 60 can place the pans 62 on a rotary dial topping system 154, best shown in FIG. 34. The rotary dial topping system 154 can be at least partially disposed within the refrigerated enclosure 900 and includes a rotary platform 158 that includes a plurality of pan receiving locations 160 thereon. The rotary platform 158 can be motor driven and controlled to move the pans 62 between a saucing station 300, a cheese station 400, and a pepperoni station 500, as described in detail herein. The pan receiving locations 160 can each include a separate rotary platform 162 that allows each pan 62 to be rotated while located in each of the sauce 300, cheese 400, and pepperoni 500 stations. The position of the rotary platform 158 and the position of each of the separate rotary platforms 162 can be separately controlled during operation of each station 300, 400, 500, and in between operations.

Rotation of the rotary platform 158 and each separate rotary platforms 162 can be performed by a motor M disposed below the respective platform (see FIG. 36). While the pizza pan 62 is located on the rotary platform 158, the sauce is applied to the dough in the sauce station 300. In the sauce station 300, the pan 62 can be rotated by the separate rotary platform 162 to assist in evenly applying the sauce or alternatively the pan can be moved by the robot arm while the sauce is being applied prior to insertion of the pan into rotary dial topping system 154. When the rotary platform 158 is rotated approximately 120° to the cheese station 400, the cheese station is operated to apply cheese to the dough in the manner described in detail herein. The pizza pan 62 can be rotated in the cheese station by the separate rotary platform 162 to aid in even distribution of the cheese.

When the rotary platform is rotated approximately 120° to the pepperoni station 500, the pepperoni station 500 is operated to slice and apply pepperoni directly to the pizza pan 62. The pan 62 can be rotatably indexed relative to the pepperoni station by the separate rotary platform 162 so that the pepperoni is distributed around the pizza pan in a desired pattern evenly distributed over the entire pizza using a series of sequential slicing operations, as will be described in detail herein.

When the rotary platform 158 is rotated approximately another 120°, the pan 62 can be removed by the robot 60 and placed on the oven conveyor track 700 that carries pizza pan 62 through the oven 800, or alternatively, can place the pan 62 on the manual station 600 for the addition of added toppings.

With reference to FIG. 35, it can be seen that the rotary dial topping system 154 can be utilized without the robot 60. In particular, an operator 174 can insert pans 62 onto the separate rotary platforms 162 and the rotary platform 158 can be operated either automatically or through operator control to move between the various stations 300, 400, 500. The operator 174 can then remove the completed pizzas for insertion in the oven 800 for baking. Thus, the rotary dial topping system 154 can be used to aid in the pizza assembly process without requiring the added expense of the robot 60.

The sauce station 300, cheese station 400, and pepperoni station 500 are each disposed in the refrigerated enclosure 900 for maintaining each of the toppings at a refrigerated temperature. As seen in FIG. 36, the pan 62 can be received under the front bottom edge of the enclosure 900 to limit the escape of refrigerated air from the enclosure 900. The enclosure 900 can also include transparent panels 156A, such as glass on one or more sides to allow the operator to visually inspect the pizza assembly operation. The panels 156A can be openable to allow easy access to the stations for refilling, maintaining, and cleaning of each station. The panels 156A can be sealed similarly to a refrigerator door for improved efficiency.

Sauce station 300 is operable to apply sauce to the dough in pan 62. The sauce can be pumped through a nozzle 302 and onto the dough. The nozzle 302 may be stationary while robot 60 manipulates pan 62 beneath the nozzle 302 so that a desired coverage of sauce on the dough is realized. The pumping of the sauce may be continuous or in spurts or batches so that the desired coverage of the sauce on the dough is realized.

The nozzle 302 is illustrated in FIGS. 21-24 and includes a nozzle body 304, a distributor 306 (FIGS. 22-24), and a clamp 308. The nozzle body 304 includes an inlet opening 310 that can include a flange 312 that is adapted to receive a pipe, tube, or other conduit for delivering pizza sauce to the nozzle 302. The inlet opening 310 is connected to a frustoconical wall portion 314 that flares outward and terminates at a clamping edge 316, best illustrated in FIGS. 22 and 24.

The distributor 306 includes a generally circular body having an outer clamping edge 318 that opposes the clamping edge 316 of the nozzle body 304. The distributor 306 is provided with a plurality of apertures 320 extending therethrough and a frustoconical mid-section 322 that is convex and extends toward the nozzle body 304. The apertures 320 can be spaced from one another a predetermined amount and can all lie within a concentric circle so that the apertures can be equally spaced from a center of the distributor 308. Alternatively, other aperture patterns can be used to provide a desired sauce distribution. The apertures 320 of the nozzle can be aligned on a concentric circle having a diameter of between 2 and 6 inches.

The clamp 308 includes two semi-cylindrical clamp portions 330, 332 hinged together by a pivot pin 334 at a first end thereof, and having a thumb screw 336 attached to opposite ends thereof for securing the clamp 308 in engagement with the clamp flange 316 and clamp flange 318 of the nozzle body 304 and distributor 306, respectively. The thumb screw 336 is pivotally attached to a free end of the clamp portion 332 by a pivot pin 340, which the thumb screw 336 threadedly engages. By tightening the thumb screw 336, the clamp 308 can become tightly engaged with the nozzle body 304 and distributor 306.

During operation of the sauce station 300, sauce is pumped through a hose or other conduit to the nozzle 302. The sauce passes through the inlet opening 310 and then flows radially outward, between frustoconical wall portion 314 and frustoconical mid-section 322, toward the apertures 320 and then through the apertures 320 onto the pizza crust disposed beneath the nozzle 302. The frustoconical mid-section 322 of the distributor 306 prevents the accumulation of sauce at the center of the nozzle 302. While the sauce is being dispersed through the nozzle 302, the robot 60 manipulates the pan 62 beneath the nozzle 302 so that even coverage of the sauce is obtained. According to an embodiment of the present application, the robot arm manipulates the pan 62 in a first large circle so that sauce is distributed along a band adjacent to the outer crust. The robot arm then moves the pan 62 in a smaller circle so that a second concentric band of sauce is then dispersed onto the crust. Alternatively, the pan 62 can be placed on a rotary platform 162 so that the pan 62 can be rotated relative to the nozzle 302 to distribute a band of sauce adjacent to the outer crust and the nozzle 302 can be moved radially inward and the pan 62 rotated again to distribute a second concentric band of sauce. Preferably, each band has a width of between 2 and 6 inches corresponding to the location and spacing of the apertures 320. Additional concentric bands or a direct single shot of sauce can be applied to the center of the pizza dough as necessary to obtain complete coverage of the pizza dough, as desired.

For purposes of cleaning, the nozzle 302 can be disassembled by releasing the clamp 308 from the nozzle body 304 and distributor 306. Each of the components can then be separately washed and then reassembled for future use.

Cheese station 400 is operable to apply cheese to the dough or sauce and dough in pan 62. The cheese may be weighed so that a consistent quantity of cheese is applied. The pan 62 may be moved or rotated by the rotary platform 162 of the rotary dial topping system 154 during the applying of the cheese so that a desired coverage of cheese on the dough is realized. The cheese may be included in pre-weighed packages or be supplied from a bulk source and weighed or measured individually for each pizza that is to be assembled.

The cheese station 400, according to one embodiment, is illustrated in FIGS. 25-32. The cheese station 400 includes a hopper 402, a gravimetric measuring device 404 that receives the cheese from the hopper 402 and dumps the cheese through a dispersing mechanism 406 that distributes the cheese evenly onto the pizza dough.

The hopper 402 includes four walls including end wall 402A, 402B and sidewalls 402C, 402D. The sidewalls 402C, 402D taper inward at a bottom portion thereof to define a trough 410 (FIG. 26) that receives a feed screw 412 having helical threads 414 that are designed, upon rotation, to feed shredded, chopped, diced or otherwise pre-cut cheese to a central aperture 416 in the bottom of the trough 410. An additional drive spindle 418 is provided in the cheese hopper 402, at a location spaced above the feed screw 412, and includes a plurality of agitating arms 418A extending radially therefrom in order to agitate the cheese that is received in the cheese hopper 402 to break up any clumps therein so as to allow the cheese to be delivered to the trough portion 410 to be fed by the feed screw 412 to the aperture 416.

As illustrated in FIG. 28, the feed screw 412 and drive spindle 418 are driven by a motor 420 (best shown in FIG. 25) that drives a drive pulley 421 that is connected to a driven pulley 422 provided on the screw shaft 412 and a driven pulley 423 provided on the drive spindle 418. Rotation of the drive motor 420 causes drive pulley 421 to drive the drive belt 424 to drive the pulleys 422 and 423 for driving the screw shaft 412 and drive spindle 418 to agitate the cheese in the cheese hopper 402, and to feed it to the aperture 416 in the bottom of the cheese hopper 402. A belt tensioning mechanism 425 is provided for maintaining tension on the drive belt 424. The belt tension mechanism 425 can include a spring bias to ensure a predetermined level of tension on the belt 424. Additional adjustment of the belt tensioning device 425 can also be provided. The drive mechanism can be provided with a slip clutch to allow the drive train to slip when a predetermined amount of resistance is applied to the drive pulley 421 so as to prevent injury to an operator, or damage to the components.

The drive spindle 418 and screw thread 412 are designed to be connected to the pulleys 423, 422, respectively, by a hexagonal or splined mating engagement to facilitate easy alignment and disengagement therebetween. In particular, the cheese hopper 402 can be lifted up from the base structure 460 to facilitate easy cleaning of the hopper 402, feed screw 412, and agitating drive spindle 418.

With reference to the cross-sectional view of FIG. 29, the cheese that is fed through the aperture 416 is received in a vessel 428 of the gravimetric measuring device 404. The gravimetric measuring device 404 is operable to activate the drive motor 420 for activating the screw thread 412 and drive spindle 418 to feed more cheese into the vessel 428 until a predetermined weight is received in the vessel 428. Upon achieving the predetermined weight, the drive motor 420 is automatically turned off. The gravimetric measuring device 404 can include a balance arm 430 pivotally received on a pivot support 432 with a mass 434 disposed at an end of the arm 430. Alternatively, a load cell can be used to weigh the cheese. Load cells can be used to weigh the cheese to an accuracy of the nearest thousandth of an ounce. A program can be utilized to account for variations in the cheese chemistry and performance characteristics and piece size to be able to meet the target weight. The operation of the drive motor 420 can be controlled by the program. When the vessel 428 is empty, the mass 434 causes the vessel 428 to lift in an upward direction, which can cause an activation switch to be operated to drive the motor 420. As the weight of the cheese received in the vessel 428 balances with the mass 434, the vessel 428 will begin to move downward, thereby deactivating the switch which then turns off the drive motor 420 so that no more cheese is fed through the aperture 416 in the hopper 402.

When a pizza pan having a pizza dough thereon is presented to the cheese station 400 beneath the dispersing mechanism 406, a servo motor 438 (best shown in FIG. 25) is activated to cause the vessel 428 to dump its contents through the cheese distribution mechanism 406. Simultaneous with, or prior to, the activation of the motor 438, the cheese dispersing mechanism 406 is also activated. The cheese dispersing mechanism 406 includes a cylindrical body 440 having a distribution shaft 442 received therein. The dispersing shaft 442 includes a plurality of radially extending arms 444 which are rotated to break up the cheese clumps as the cheese is dumped from the vessel 428 through the cylindrical body 440. The rotational speed of the dispersing shaft 442 is designed such that the arms 444 break up any cheese clumps passing through the cylindrical body 440. As the cheese exits the cylindrical body 440, an upper shield member 450 is provided in the form of a cylindrical wall that causes any radially projecting cheese particles to bounce off in a random dispersing pattern, and then to pass through outer guide cylinder 452 that is disposed adjacent to the pizza dough so as to prevent the cheese particles from being dispersed beyond the outer wall of the lower cylinder 452.

The vessel 428 is designed to be received in an annular ring 462 supported at the end of the balance arm 430 that allows for easy removal of the vessel 428 for cleaning purposes. The vessel 428 includes a shoulder portion 428A that is received against the upper edge of the support ring 462. The cylindrical body 440 of the dispersal mechanism 406 is in the form of a removable sleeve having an upper flange 440A received against a support member 464 so that the cylindrical body 440 can be easily removed for cleaning purposes. The distribution spindle 442 is also designed to be easily removed and reassembled for cleaning purposes. The shields 450, 452 are also designed for easy removal and cleaning.

An alternative cheese station 1400, according to second embodiment, is illustrated in FIGS. 36-43. The cheese station 1400 includes a hopper 1402, a volumetric measuring device 1404 that receives the cheese from the hopper 1402 and dumps the cheese through a dispersing mechanism 1406 that distributes the cheese evenly onto the pizza dough.

The hopper 1402 includes four walls including end wall 1402A, 1402B and sidewalls 1402C, 1402D. The sidewalls 1402C, 1402D taper inward to define a trough 1410 (FIG. 43) that receives a pair of feed screws 1412 each having helical threads 1414 that are designed, upon rotation, to feed pre-cut cheese to a central aperture 1416 in the bottom of the trough 1410. An additional agitating drive spindle (not shown) can be provided in the cheese hopper 1402, at a location spaced above the feed screws 1412, in order to agitate the cheese that is received in the cheese hopper 1402 to break up any clumps therein so as to allow the cheese to be delivered to the trough portion 1410 to be fed by the feed screws 1412 to the aperture 1416. As shown in FIG. 39, a bridge 1417 can be disposed within the hopper 1402 above the aperture 1416 to prevent cheese from falling through the central aperture 1416 in the bottom of the hopper 1402.

As illustrated in FIG. 28, the feed screws 1412 are driven by a motor 1420 (best shown in FIG. 38) and gear train 1421. Rotation of the drive motor 1420 causes gear train 1421 to drive the screw shafts 1412 to feed the cheese to the aperture 1416 in the bottom of the cheese hopper 1402. The drive mechanism can be provided with a slip clutch to allow the drive train to slip when a predetermined amount of resistance is applied to the screw shafts 1412 so as to prevent injury to an operator, or damage to the components.

The screw threads 1412 are designed to be connected to the gear train 1421, respectively, by a hexagonal or splined mating engagement to facilitate easy alignment and disengagement therebetween. In particular, the cheese hopper 1402 can be lifted up from the base structure 1460 to facilitate easy cleaning of the hopper 1402 and feed screws 1412. The gear train can be covered by a housing 1422 and base plate 1424, as shown in FIG. 38.

With reference to the cross-sectional view of FIG. 43, the cheese that is fed through the aperture 1416 is received in a vessel 1428 of the volumetric measuring device 1404. The volumetric measuring device 1404 is operable to activate the drive motor 1420 for activating the screw threads 1412 to feed more cheese into the vessel 1428 until a predetermined volume is received in the vessel 1428. Upon achieving the predetermined volume, the drive motor 1420 is automatically turned off. The volumetric measuring device 1404 can include a sensor 1434 disposed at a top portion of the vessel 1428 to detect when the vessel is full. When the vessel 1428 is empty, the sensor 1434 is unobstructed and can cause an activation switch to be operated to drive the motor 1420. As the volume of the cheese received in the vessel 1428 obstructs the sensor 1434, the sensor 1434 deactivates the switch which then turns off the drive motor 1420 so that no more cheese is fed through the aperture 1416 in the hopper 1402.

When a pizza pan having a pizza dough and sauce thereon is presented to the cheese station 1400 beneath the dispersing mechanism 1406, an electric solenoid 1438 (best shown in FIG. 41) is activated to cause trap doors 1439 at the bottom of the vessel 1428 to dump its contents through the cheese distribution mechanism 1406. A manual dump lever 1441 can be manually pulled to release the trap doors 1439. The trap doors 1439 are held shut by springs 1443, and are overcome by the activation of electric solenoid 1438 or manual lever 1441. Sensors 1445 can be provided for detecting an open or closed state of the trap doors 1439 to ensure that the screw threads are not operated unless the doors 1439 are closed. The doors 1439 are cam operated by movement of drive plate 1447, by the electric solenoid 1438. The cheese dispersing mechanism 1406 can include a conical body 1440 having a plurality of apertures therein. As disclosed with reference to the cheese station 400 above, a dispersing shaft can be provided including a plurality of radially extending arms which are rotated to break up the cheese clumps as the cheese is dumped from the vessel 1428. As the cheese contacts the conical body 1440, the cheese is caused to disperse radially outwardly over the surface of the conical body 1440 and to pass through the various openings 1442 in the conical body 1440. The openings 1442 in the conical body 1440 are sized and spaced to distribute the cheese as desired over the pizza dough. An outer cylinder 1452 is disposed adjacent to the pizza dough at the base of the conical body 1440 so as to prevent the cheese particles from being dispersed beyond the outer wall of the cylinder 1452 so that the cheese stays away from the outer crust of the pizza dough as desired.

The vessel 1428 is designed to be removably supported by a pin 1462 that allows for easy removal of the vessel 1428 for cleaning purposes. The pin 1462 extends through the top of the vessel 1428 and is disposed above the light beam emitted by the sensor 1434 that senses when the vessel 1428 is full. The pin 1462 shields/prevents the cheese that is fed to the vessel from obstructing the sensor light beam until the vessel 1428 fills from below and subsequently obstructs the sensor light beam.

The conical body 1440 and outer cylinder 1452 are also designed for easy removal and cleaning. The conical body 1440 can be supported at the lower end of the outer cylinder 1452 and the outer cylinder 1452 can include bayonet shaped slots 1454 for receiving support pins 1456 at the ends of support arms 1458. When the cheese is being dispersed in to the pan 62, the pan can be lifted up by the lift system 1460, as shown in FIG. 36. With the upper edge of the pan 62 lifted up around the lower edges of the outer cylinder 1452 and the conical body 1440, the cheese is maintained in the pan.

With reference to FIG. 49, an alternative cheese station 1500 is shown including a hopper 1502, a cheese cup 1504, a rotary dial topping system 1506, and a pan lift system 1508. The hopper 1502, cheese cup 1504, and rotary dial 1506 can be constructed similar to the hoppers, cheese cup, and rotary dial apparatus previously described. The pan lift system 1508 includes a platform 1510 located below the cheese hopper 1502 and a vertical shaft 1512 supported by a load cell 1514 and a lift device 1516. The lifting device 1516 raises vertically and lifts the platform 1510 to lift a pan 62 supported beneath the hopper. As the pan 62 is lifted off the rotary dial 1506, the load cell measures a weight of the pan 62 with the crust and sauce already within the pan 62. As cheese is distributed into the pan 62, the load cell measures the amount of cheese distributed on the pizza.

In operation, when an operator or robot loads a pan in the front station of the rotary dial 1506, the augers of the cheese hopper 1502 start pre-filling the cheese cup 1504. This pre-filing process is performed with the auger motors running at a relatively "fast" speed. When the cheese cup 1504 is filled (as detected by a sensor or after a predetermined time), the augers stop. The volume of the cheese cup 1504 can yield a "prefill" amount such as 5.5-7.0 ounces. The time required to fill the cup can be recorded by a CPU.

Simultaneous with the cheese cup prefill, the dial 1506 rotates a pan into the cheese station. The pan lift system 1508 raises the pan 62 and the load cell 1514 weighs the pan, dough, and sauce. The load cell tares itself. Flipper doors in the bottom of the cheese cup 1504 are then opened dropping the pre-filled cheese onto the pan 62. The weight of prefill is then recorded as "Drop Weight." The augers of the hopper 1502 are then turned on and continue filling cheese at a decelerated speed. When a weight of the cheese hits a predetermined set point, the augers slow to a "Crawl" speed. During the "Crawl" speed, the augers turn on for a predetermined period of time and then off for a second predetermined period of time to allow the fallen cheese to land on the pizza. When the weight of the cheese reaches its desired goal weight, the cycle is complete. The system waits a final time period to allow any remaining cheese to fall and records the "Final Weight."

The chemistry and performance characteristics of the cheese can vary significantly. In order to compensate for these variations, the CPU can automatically adjust the parameters of the cheese prefill, deceleration, and crawl speeds and times to feed the cheese fast enough to hit a target cycle time, while avoiding operating too fast that the cheese jams up or puts excessive amounts of cheese on the pizza above the target amount. The prefill time is a time used to prefill the cup to the sensor. For each cycle, the prefill time is recorded. If the cup is filled faster than the Minimum Prefill Time, the speed is decreased incrementally by, for example, 2%. Likewise, if the cup is filled slower than the Maximum Prefill Time, the speed can be increased incrementally by, for example, 2%. There are overriding maximum and minimum speeds that the system cannot automatically adjust past.

The target cheese weight is set to a predetermined amount. If the Final Weight exceeds the target cheese weight by a predetermined amount, the Deceleration Speed and the Crawl Speed can be decreased by an incremental amount such as 2%.

The target cycle time can be set to a predetermined time. If the target cycle time is exceeded, the program increases both the Deceleration Speed and the Crawl Speed by an incremental amount such as 2%.

If the cheese amount exceeds the target weight and the time is longer than the target cycle time, the two algorithms cancel out.

There are overriding minimum and maximum limits on both the Deceleration Speed and the Crawl Speed.

Referring now to FIGS. 8-19, details of pepperoni station 500 and the operation of same are shown. Pepperoni station 500 is at least partially contained within a refrigerated compartment 504 (which can be the refrigerated compartment 900 described above) so that the pepperoni sticks 506 therein are maintained in a suitable environment. Pepperoni station 500 includes a base 508 with a plurality of openings 510 therethrough. A plurality of guide members 512 are attached to base 508 and extend through openings 510. Guide members 512 are configured to receive pepperoni sticks 506 through top openings 514. The upper portion of guide members 512 and base 508 are located within refrigerated compartment 504. The portion of guide members 512 above base 508 may include a plurality of rods 511 that allow the pepperoni 506 therein to easily communicate with the environmental conditions within refrigerated compartment 504. The portion of guide members 512 below base 508 may include solid sleeves 513 (FIGS. 8, 14) or rods 511. The use of solid sleeves 513 can allow the conditioned air within refrigerated compartment 504 to maintain contact with the portion of pepperoni 506 that is located below base 508 and outside of refrigerated compartment 504. With the refrigerated compartment 900, the use of the sleeves below the base 508 is unnecessary. A motor 516 is attached to base 508 and is operable to rotate a slicing assembly 518 that is located below the base 508. Motor 516 is operable to rotate slicing assembly 518 relative to base 508 to slice pepperoni, as described below.

Pepperoni 506 are manually loaded into guide members 512 by a worker. Access to guide members 512 can be realized through an access door in refrigerated compartment 504/900, thereby allowing a worker to insert new pepperoni 506 into guide members 512 or remove existing pepperoni therefrom.

Slicing assembly 518 includes a post 520 with a driven gear 522 on an end thereof for driving engagement with a drive gear 524 attached to the motor 516. Post 520 is rotatably supported within a pair of bushings 526 supported by a housing 528. Post 520 can rotate within bushings 526 as controlled by the rotation of the drive gear 524 of the motor 516.

A central portion of a connecting arm 530 is attached to post 520. Connecting arm 530 is rotationally fixed relative to post 520 such that connecting arm 530 rotates with rotation of post 520. Connecting arm 530 extends in a curved manner from post 520 out to the end such that connecting arm 530 may have a general "S" shape when viewed from above. A slicing blade 534 is rotatably supported at each end of the connecting arm 530. A slicing motor 532 includes a drive gear 536 operable to drive a driven gear 538 attached to a drive shaft 540 for driving a pair of gear trains 542 for rotating the slicing blades 532 to slice pepperoni 506, as described below. The drive shaft 540 is concentric to and rotatably supported within post 520. The gear trains 542 are supported by and housed within the connecting arm 530. It should be noted that each of the slicing blades could alternatively be driven by separate drive motors that could be mounted directly to the connecting arm 530.

Slicing assembly 518 includes a plate 544 attached to an end of post 520. Plate 540 is rotationally fixed relative to post 520 so that plate 544, connecting arm 530, and slicing blades 532 all rotate in unison with the rotation of post 520. Plate 544 may be generally circular in plain view with a pair of apertures or recesses (apertures are shown) 546 therein corresponding with slicing blades 532. Apertures 546 are slightly larger than the dimensions of slicing blades 532 so that pepperoni slices sliced by slicing blade 532 can fall through a gap 548 therebetween and land on the dough, sauce and cheese in pan 62 beneath slicing assembly 518. Plate 544 includes an upper surface 550 upon which the end of pepperoni 506 rests while waiting to be sliced by slicing blades 532.

Pepperoni station 500 is configured to be easily disassembled so that a worker can clean the various components therein, as required by the applicable food safety standards. The easy disassembly can be realized by the use of fasteners that retain multiple components in position such that the removal of a single fastener may allow for the removal of multiple components from pepperoni station 500 for cleaning. The various components of pepperoni station 500 that come in contact with the food can be of a material suitable for food service use. By way of non-limiting example, such material includes stainless steel.

Slicing blades 532 include a single beveled edge 552 with the largest radial dimension occurring on an upper surface 554 thereof and a lower radial dimension occurring on the lower surface 556. The upper surface 554 of slicing blades 532 may be slightly above upper surface 550 of plate 544. The distance between the upper surface 554 of slicing blade 532 and upper surface 550 of plate 544 may dictate the thickness of the slices removed from pepperoni 506.

Plate 544 is spaced apart from the end of sleeves 513 such that pepperoni 506 within guide members 512 can extend downwardly beyond the end of sleeves 513 and rest on upper surface 550.

Figure 16:
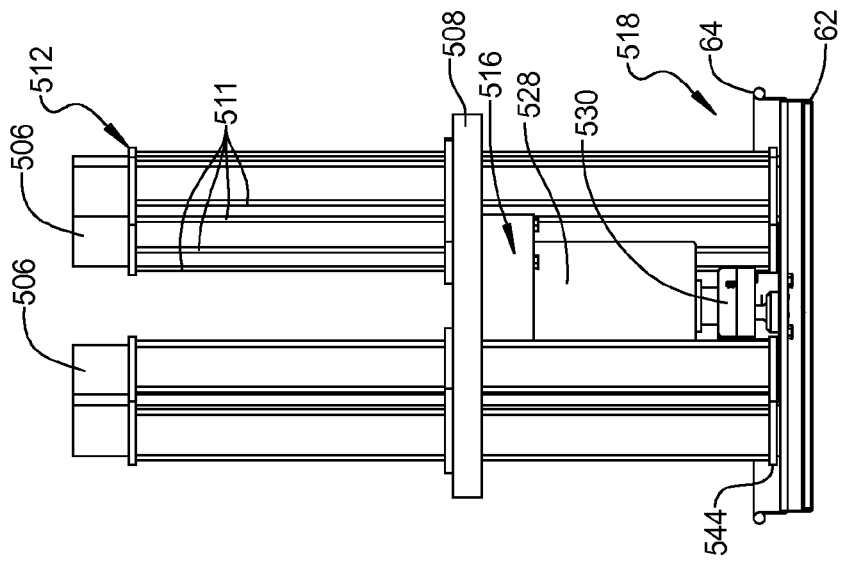
FIGS. 15 and 16 are side views of the pepperoni station with the pizza pan in various positions relative to the pepperoni station.
Figure 15:
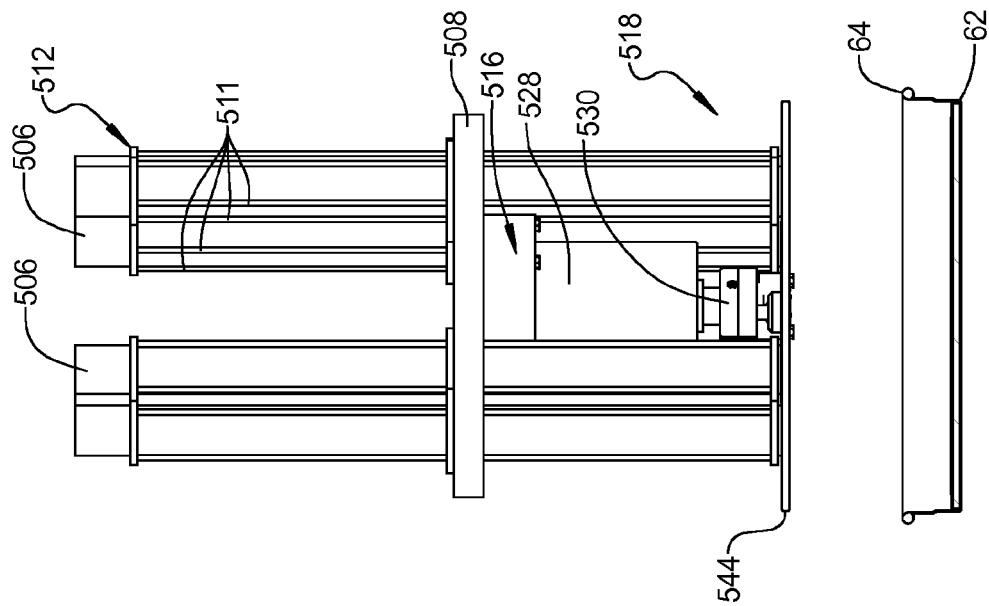

When system 50 is utilizing pepperoni station 500, robot 60 or alternatively the rotary dial topping system 154 can move the pan 62 from a position below pepperoni station 500, as shown in FIG. 15, to a raised vertical position wherein the end of slicing assembly 518 is located below a top edge 64 of pan 62, as shown in FIG. 16. The rotary dial topping system 154 includes a lift device associated with the separate rotary platform 162. With slicing blades 532 located below top edge 64 of pan 62, the slices of pepperoni that are made from pepperoni stick 506 can fall onto the dough, sauce and cheese within pan 62 in a desired location and/or orientation. When pan 62 is positioned relative to pepperoni station 500, slicing motor 534 is operated to rotate slicing blades 532 relative to plate 544. Rotary motor 516 rotates slicing assembly 518 relative to guide members 512 so that slicing blades 532 contact and slice through pepperoni 506. For example, as shown in FIG. 17A, in the starting position, slicing blades 532 can be in the position wherein they are not engaged with pepperoni 506. Motor 516 rotates slicing assembly 518 clockwise, in the views depicted in FIG. 17, such that slicing blades 532 slice through pepperoni 506 in guide members 512 containing individual pepperoni 506, as shown in FIG. 17B. Motor 516 can then rotate slicing assembly 518 counterclockwise, in the views depicted in FIG. 17, such that slicing blades 532 engage with and slice through the groups of three pepperonis 506 in guide members 512, as shown in FIG. 17C. Motor 516 can then rotate slicing assembly 518 clockwise, in the views depicted in FIG. 17, to return back to a starting position, as shown in FIG. 17D. With this operation, eight slices of pepperoni are removed from pepperoni 506 within guide members 512 and disposed on the dough within pan 62.

Figure 19:
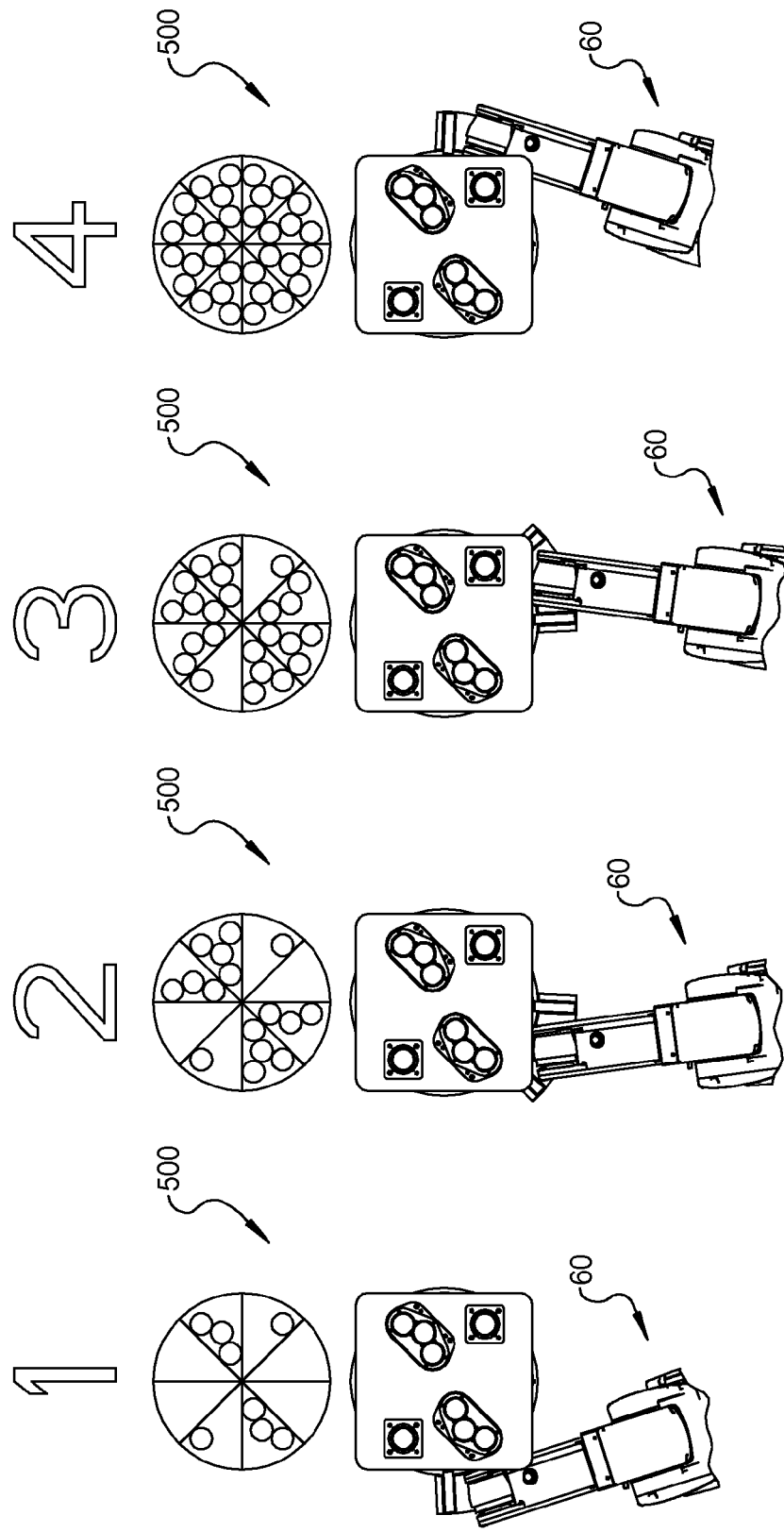

Pan 62 can be rotated or moved 45 degrees relative to pepperoni station 500 by robot 60 or by rotary dial topping system 154 and the slicing operation repeated so that another eight slices of pepperoni are applied to the dough in pan 62. By way of example, as shown in FIGS. 18 and 19, robot arm 68 can change the location of pan 62 relative to pepperoni station 500 from position 1 through positions 2 and 3 and into position 4. At each position, pepperoni station 500 is operated to cut and drop eight slices of pepperoni onto the dough within pan 62. At the end of the operation, 32 slices of pepperoni are disposed on the dough in pan 62, as indicated in FIG. 19D. Thus, in the first position, eight slices of pepperoni are disposed on the dough in pan 62, as shown in FIG. 19A. As shown in FIG. 19B, in position 2 another eight slices of pepperoni are disposed on the dough in pan 62. Similarly, as shown in FIG. 19C, another eight slices of pepperoni are disposed onto the dough in pan 62 at position 3. Finally, when in position 4, another eight slices of pepperoni are placed on the dough in pan 62, resulting in the total of 32 pepperoni slices on the dough in pan 62.

The arrangement of guide members 512 and pepperoni 506 within pepperoni station 500 can advantageously provide for a configuration wherein each resulting slice of pizza has four entire pepperoni slices thereon. In particular, as shown in FIGS. 19A-19D, the resulting pizza can form eight slices. The placement of the pepperoni can be made such that the resulting pizza can be cut into eight slices wherein each slice contains exactly four whole slices of pepperoni, thereby facilitating a consistent quality pizza. Moreover, the ability to consistently make such a pizza, wherein four whole slices of pepperoni can be realized on each slice, can provide for an aesthetically pleasing appearance to the pizza and a more satiating experience in consuming the pizza. It should be understood that the number of pepperoni slices applied to the pizza in each slicing operation can be varied. It is anticipated that for most efficient operation between 3 and 8 slices of pepperoni can be applied with each slicing operation although more or fewer can also be utilized.

After going through pepperoni station 500, system 50 can then place pan 62 in an oven 800, if a cheese-and-pepperoni pizza is desired. If additional toppings are desired, system 50 can move pan 62 to other automated topping stations (not shown) where additional toppings can be applied. Alternatively, as shown, robot 60 can move pan 62 to manual station 600 where a worker can then add the additional toppings and place the resulting pizza in the oven for baking therein.

When just a cheese pizza is desired, system 50 can skip pepperoni station 500 and place the pan 62 directly in the oven 800 after going through the sauce and cheese stations 300, 400. In this manner, system 50 can automatically make cheese pizzas and pepperoni pizzas with limited interaction by a worker.

Referring now to FIG. 20, system 50 can use one or more controllers to control the various components of system 50. Each controller may include one or more modules therein to perform the described functionality. For example, an individual controller and/or multiple controllers containing one or more modules may be associated with the various components in each one of the stations and with robot 60 such that the operation of the various stations and robot 60 are coordinated to form the desired pizzas. In one exemplary configuration, a controller 96 communicates with the various stations, the oven, a display 98, a worker input station 99, and robot 60. The communication can be two-way communication so that various information and instructions can be relayed between the controller 96 and the various components and stations. The worker input station 99 can allow a worker to input desired instructions or programming for controller 96 and/or the various modules utilized by controller 96 and/or the other components and stations. Display 98 can function to provide visual indication information to the worker on the operation of system 50 and/or the individual components or stations. The various components can include sensors that enable the detection of pan 62 within rack station 100 on the oven and stacked in manual station 600. In this manner, robot 60 can retrieve pan 62 containing dough from rack station 100 and prevent overloading of the oven or manual station 600 when an existing pan 62 would interfere with the placement of a new pan 62.

System 50 may be configured to provide a small foot print wherein system 50 can be installed in existing retail locations without requiring additional retail space or enlarging of the preparation area. The system 50 can be separated into easily movable modules wherein the rotary dial topping system 154 including the sauce station 300, the cheese stations 400, the pepperoni station 500, the rotary platform as well as the refrigerated enclosure 900 can be provided as a single module as shown in FIG. 44 that can be supported on a plurality of wheels 902 for mobility. Likewise, the rack system 100, manual station 600, conveyor station 700, robot 60 and oven 800 can each be separately movable modules that can be easily transported and/or moved on wheels within a given space.

Thus, an automated pizza assembly system 50 according to the present disclosure can automate various steps in the pizza making process. The automation can advantageously provide consistent pizza while decreasing the man hours required to produce the pizzas. Additionally, the automated pizza assembly system 50 according to the present disclosure can be easily disassembled for cleaning. Moreover, the automated pizza assembly system 50 can make a robust simplistic design wherein the ease of operation, maintenance, and use is realized.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An apparatus for assembling a pizza, comprising:
a pizza sauce spreading station:
a cheese spreading station;
a pepperoni applying station; and
a rotary platform including at least one pan receiving location, wherein said rotary platform is rotatable about a platform axis to move a pizza pan received in said at least one pan receiving location to each of said pizza sauce spreading station, said cheese spreading station and said pepperoni applying station, and wherein said pizza sauce spreading station, said cheese spreading station, and said pepperoni applying station are concentrically disposed about said platform axis, wherein said at least one pan receiving location of said rotary platform includes a separate rotary platform adapted for receiving a pizza pan thereon and rotating said pan within at least one of said pizza sauce spreading station and said pepperoni applying station.

2. The apparatus according to claim 1, wherein said rotary platform and said separate rotary platform are each rotatably driven by a motor.

3. The apparatus of claim 1, wherein the pepperoni applying station comprises a base with a plurality of base openings through the base, a plurality of guide members attached to the base and configured to receive a pepperoni stick through top openings located at an upper portion of the guide members above the base, each guide member extending from the upper portion through a corresponding one of the base openings to a lower portion below the base, and a slicing assembly located below the base and receiving the pepperoni sticks exiting the guide members, the slicing assembly rotating relative to the base for slicing the pepperoni sticks when driven by a motor attached to the base.

4. The apparatus of claim 3, wherein the pepperoni applying station further comprises a plurality of rods included within the guide members at the upper portion.

5. The apparatus of claim 4, wherein the plurality of rods are further included within the guide members at the lower portion below the base.

6. The apparatus of claim 3, wherein the pepperoni applying station further comprises a refrigerated compartment containing the base and the upper portion of the guide members for maintaining the pepperoni sticks therein at a desired temperature.

7. The apparatus of claim 6, wherein the lower portion of the guide members and the slicing assembly are outside of the refrigerated compartment.

8. The apparatus of claim 6, wherein the pepperoni applying station further comprises a plurality of sleeves received by the lower portion of the guide members below the base, the sleeves allowing conditioned air within the refrigerated compartment to maintain contact with a portion of the pepperoni sticks located below the base and outside the refrigerated compartment.

9. The apparatus of claim 3, wherein the pepperoni applying station further comprises a refrigerated compartment containing the base, the plurality of guide members, and the slicing assembly.

10. The apparatus of claim 3, wherein the slicing assembly comprises:
a post having a first end portion rotatably coupled to the motor and a second end portion rotationally fixed to a central portion of a connecting arm such that the connecting arm rotates in unison with the post when driven by the motor;
the connecting arm including a pair of ends extending from the central portion of the connecting arm in a direction substantially perpendicular to an axis of the post;
a pair of slicing blades rotatably coupled at a center axis to corresponding ones of the connecting arm ends such that the slicing blades rotate in unison with the connecting arm and the post about the axis of the post when driven by the motor for slicing pepperoni sticks exiting the guide members, the center axis of each of the slicing blades substantially parallel to the axis of the post.

11. The apparatus of claim 10, wherein the slicing assembly further comprises:
a plate rotationally fixed to the second portion of the post below the pair of slicing blades, the plate including an upper surface upon which an end of the pepperoni sticks exiting the guide members rests while waiting to be sliced by the slicing blade.

12. The apparatus of claim 11, wherein the plate includes a pair of apertures coaxial with corresponding ones of the slicing blades, each aperture having a larger diameter than the diameter of the slicing blades such that a gap is defined between circumferences of the apertures and corresponding slicing blades, the gap permitting pepperoni slices sliced by the slicing blades to fall through the gap and land on pizza in a pan beneath the slicing assembly.

13. An apparatus for slicing pepperoni, the apparatus comprising:
a post including a first end portion and a second end portion;
a plurality of guide members having openings configured to receive pepperoni sticks;
a plate coaxial and rotationally fixed to the second end portion of the post, the plate including a top surface facing the openings of the guide members, the top surface for receiving end surfaces of pepperoni sticks exiting from the guide members;
a pair of slicing blades rotationally fixed to the post for slicing the end surfaces of the pepperoni sticks when the plate rotates through the post, each slicing blade including an associated slicing blade axis parallel to an axis of the post and a bottom surface opposing the top surface of the plate.

14. The apparatus of claim 13, further comprising:
a connecting arm having a central portion rotationally fixed to the post at a location above the plate, the connecting arm including a pair of ends each extending perpendicularly outward from the axis of the post for rotatably coupling each of the slicing blades such that the slicing blades rotate about the axis of the post in unison with the plate, the post, and the connecting arm.

15. The apparatus of claim 14, further comprising:
a slicing motor;
a drive shaft concentric to and rotatably supported within the post, the drive shaft rotationally driven by the slicing motor; and
a pair of gear trains within the connecting arm rotationally coupled to the drive shaft, each gear train rotationally driven by the slicing motor through the drive shaft for rotating corresponding ones of the slicing blades about associated slicing blade axis.

16. The apparatus of claim 14, further comprising:
a slicing motor within the connecting arm;
a pair of gear trains within the connecting arm rotationally coupled to the slicing motor, each gear train rotationally driven by the slicing motor for rotating corresponding ones of the slicing blades about associated slicing blade axis.

17. The apparatus of claim 14, wherein the connecting arm includes a curved profile between the central portion and each of the ends.

18. The apparatus of claim 13, further comprising:
a motor rotatably coupled to the first end portion of the post, the motor operable to drive the post for rotating the plate and the slicing blades about the axis of the post.

19. The apparatus of claim 18, further comprising:
a drive gear attached to the motor; and
a driven gear meshingly engaged with the drive gear and rotationally fixed to the first end portion of the post, the motor driving the drive gear for controlling rotation of the plate and the slicing blades about the axis of the post when rotated driven gear and the post.

20. The apparatus of claim 13, wherein the pair of slicing blades comprise a beveled edge with a largest radial dimension of the beveled edge occurring on an upper surface of the slicing blades and a lower radial dimension of the beveled edge occurring on a lower surface of the slicing blades.

21. The apparatus of claim 13, wherein the bottom surface of the pair of slicing blades opposed to the top surface of the plate is spaced at a distance to achieve a desired thickness of slices of pepperoni when sliced by the slicing blades.

22. The apparatus of claim 13, wherein the plate rotates in a first direction to engage the slicing blades with the pepperoni sticks exiting from a first portion of the guide members; and wherein the plate rotates in an opposite second direction to engage the slicing blades with the pepperoni sticks exiting from a second portion of the guide members.

23. The apparatus of claim 1, wherein the rotary platform includes a pizza-receiving side, and wherein the platform axis, about which the rotary platform rotates, intersects the pizza-receiving side of the platform.

24. The apparatus of claim 1, wherein the pizza sauce spreading station is offset from the cheese spreading station by an angle equal to 120 degrees about the platform axis.

25. The apparatus of claim 1, wherein the at least one pan receiving location includes a first pan receiving location and a second pan receiving location, the first and second pan receiving locations concentrically disposed about the platform axis.

26. The apparatus of claim 13, wherein the plate includes a pair of apertures coaxial with corresponding ones of the slicing blades.

* * * * *